US012610103B2

(12) United States Patent
Yu et al.

(10) Patent No.: US 12,610,103 B2
(45) Date of Patent: Apr. 21, 2026

(54) REMOTE CONTROL DEVICE AND IMAGE DISPLAY DEVICE HAVING SAME

(71) Applicant: LG ELECTRONICS INC., Seoul (KR)

(72) Inventors: Seonil Yu, Seoul (KR); Janghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 18/572,478

(22) PCT Filed: Jun. 24, 2021

(86) PCT No.: PCT/KR2021/007964
§ 371 (c)(1),
(2) Date: Dec. 20, 2023

(87) PCT Pub. No.: WO2022/270655
PCT Pub. Date: Dec. 29, 2022

(65) Prior Publication Data
US 2024/0292048 A1     Aug. 29, 2024

(51) Int. Cl.
*H04N 21/422*          (2011.01)
*G08C 17/02*           (2006.01)
(Continued)

(52) U.S. Cl.
CPC ....... *H04N 21/42221* (2013.01); *G08C 17/02* (2013.01); *G08C 23/04* (2013.01); *H04N 21/41265* (2020.08); *G08C 2201/20* (2013.01)

(58) Field of Classification Search
None
See application file for complete search history.

(56) References Cited

U.S. PATENT DOCUMENTS

2010/0302154 A1    12/2010  Lee et al.
2016/0125733 A1*    5/2016  Sallas ................... G08C 17/02
                                                          398/106

FOREIGN PATENT DOCUMENTS

KR      1020130080362       7/2013
KR      1020130114405       10/2013
(Continued)

OTHER PUBLICATIONS

European Patent Office Application Serial No. 21947246.1, Search Report dated Apr. 9, 2025, 6 pages.
(Continued)

*Primary Examiner* — Samira Monshi
(74) *Attorney, Agent, or Firm* — LEE, HONG, DEGERMAN, KANG & WAIMEY

(57)                ABSTRACT

The present disclosure relates to a remote control device and an image display apparatus including the same. A remote control device according to an embodiment of the present disclosure includes: a plurality of keys; an IR module configured to perform IR communication in response to a part of the plurality of keys; and an RF module configured to perform RF communication in response to another part of the plurality of keys, and the RF module transmits wireless channel information to an image display apparatus at a first interval, and when pairing with the image display apparatus is not completed, transmits the wireless channel information at a second interval less than the first interval. As a result, wireless pairing can be stably performed in response to a surrounding communication environment.

18 Claims, 26 Drawing Sheets

(51) Int. Cl.
G08C 23/04 (2006.01)
H04N 21/41 (2011.01)

(56) References Cited

FOREIGN PATENT DOCUMENTS

| KR | 101598336 | 2/2016 |
| KR | 1020190041690 | 4/2019 |
| WO | 2020251305 | 12/2020 |

OTHER PUBLICATIONS

PCT International Application No. PCT/KR2021/007964, International Search Report dated Mar. 30, 2022, 2 pages.

* cited by examiner

FIG. 10

| KEY NAME | | IR | RF |
|---|---|---|---|
| POWER | ⏻ | 0 | X |
| HOME | ⌂ | 0 | 0 |
| VOICE | 🎤 | X | 0 |
| CHANNEL | | 0 | 0 |
| Volume | | 0 | 0 |
| Pointer | | X | 0 |

1320

1350

1352

REMOTE CONTROL DEVICE AND IMAGE DISPLAY DEVICE HAVING SAME

CROSS-REFERENCE TO RELATED APPLICATION(S)

This application is the National Stage filing under 35 U.S.C. 371 of International Application No. PCT/KR2021/007964, filed on Jun. 24, 2021, the contents of which are all incorporated by reference herein in its entirety.

BACKGROUND

1. Field

The present disclosure relates to a remote control device and an image display apparatus including the same, and more particularly, to a remote control device and an image display apparatus including the same which can stably perform wireless pairing in response to a surrounding communication environment.

2. Description of the Related Art

An image display apparatus as an apparatus displaying an image can display various images through the image display apparatus.

Meanwhile, a remote control device is used for remote control of the image display apparatus.

In recent years, wireless communication has been performed by various electronic devices around the image display apparatus, and as a result, a phenomenon in which a success rate of wiring pairing between the remote control device and the image display apparatus is lowered becomes a problem.

SUMMARY

An object of the present disclosure is to provide a remote control device and an image display apparatus including the same which stably perform wireless paring in response to a surrounding communication environment.

Meanwhile, another object of the present disclosure is to provide a remote control device and an image display apparatus including the same which can increase a success rate of the wireless pairing.

Meanwhile, yet another object of the present disclosure is to provide a remote control device and an image display apparatus including the same which can remotely control a set-top box using the image display apparatus.

In order to achieve the object, a remote control device according to an embodiment of the present disclosure includes: a plurality of keys; an IR module configured to perform IR communication in response to a part of the plurality of keys; and an RF module configured to perform RF communication in response to another part of the plurality of keys, and the RF module transmits wireless channel information to an image display apparatus at a first interval, and when pairing with the image display apparatus is not completed, transmits the wireless channel information at a second interval less than the first interval.

Meanwhile, the RF module may transmit a plurality of wireless channel information to the image display apparatus at the first interval, and when the pairing with the image display apparatus is not completed after transmitting the wireless channel information at the first interval, transmit the plurality of wireless channel information at the second interval.

Meanwhile, an interval for transmitting the plurality of wireless channel information upon transmitting the plurality of wireless channel information at the second interval may be less than an interval for transmitting the plurality of wireless channel information upon transmitting the plurality of wireless channel information at the first interval.

Meanwhile, when the pairing with the image display apparatus is terminated after transmitting the wireless channel information at the second interval, the RF module may transmit the wireless channel information at the second interval other than the first interval.

Meanwhile, the RF module may transmit the plurality of wireless channel information to the image display apparatus at the first interval again when the pairing with the image display apparatus is terminated after transmitting the wireless channel information at the second interval, and transmit the plurality of wireless channel information at the second interval when the pairing with the image display apparatus is not completed after transmitting the wireless channel information at the first interval.

Meanwhile, the IR module may transmit a power-on signal corresponding to a power key operation among the plurality of keys, and the RF module may transmit the wireless channel information to the image display apparatus at the first interval after transmitting the power-on signal, and transmit the wireless channel information at the second interval less than the first interval when the pairing with the image display apparatus is not completed within an predetermined period.

Meanwhile, after the pairing with the image display apparatus is completed, when a key corresponding to the RF communication among the plurality of keys operates, the RF module may output a RF signal corresponding to the key based on the RF communication, and when a key corresponding to the IR communication among the plurality of keys operates, the IR module may output an IR signal corresponding to the key based on the IR communication.

Meanwhile, the RF module may not output the RF signal when a key corresponding to only the RF communication among the plurality of keys operates before the pairing with the image display apparatus is completed.

Meanwhile, when a key corresponding to both the RF communication and the IR communication among the plurality of keys operates before the pairing with the image display apparatus is completed, the RF module may not output the RF signal, and the IR module may output an IR signal corresponding to the key based on the IR communication.

Meanwhile, when a key corresponding to both the RF communication and the IR communication among the plurality of keys operates after the pairing with the image display apparatus is completed, the RF module may output the RF signal, and the IR module may not output the IR signal.

Meanwhile, the IR module may output the IR signal when a key corresponding to only the IR communication among the plurality of keys operates before the pairing with the image display apparatus is completed.

Meanwhile, the key corresponding to the RF communication among the plurality of keys may include a voice key, the key corresponding to the IR communication among the plurality of keys may include a power key, and the key corresponding to both the RF communication and the IR communication among the plurality of keys may include a channel control key, a volume control key, a number key, an OK key, and a color key.

Meanwhile, the RF module may transmit the wireless channel information to the image display apparatus at the first interval before setting for remote control of a set-top box or an external device is completed, and transmit the wireless channel information at a second interval less than the first interval after the setting for remote control of the set-top box or the external device is completed.

Meanwhile, the RF module may transmit the wireless channel information to the image display apparatus at the first interval when a power saving mode is switched to a power saving mode release, and transmit the wireless channel information at the second interval less than the first interval when the pairing with the image display apparatus is not completed within a predetermined period.

Meanwhile, in a state in which the transmission of the wireless channel information at the second interval in the RF module is performed at a predetermined number of times or more, when the pairing with the image display apparatus is not completed, the RF module may not output the RF signal, and the IR module may output the IR signal.

In order to achieve the object, a remote control device according to another embodiment of the present disclosure includes: a plurality of keys; an IR module configured to perform IR communication in response to a part of the plurality of keys; and an RF module configured to perform RF communication in response to another part of the plurality of keys, and the RF module transmits wireless channel information to an image display apparatus at a first interval before setting for remote control of a set-top box or an external device is completed, and transmits the wireless channel information at a second interval less than the first interval after the setting for remote control of the set-top box or the external device is completed.

In order to achieve an object, an image display apparatus according to an embodiment of the present disclosure includes: a display; a signal processing device configured to output an image signal to the display; a remote control device; and an interface configured to perform communication with the remote control device.

Meanwhile, the interface may perform wireless pairing with the remote control device based on the wireless channel information received during a first period between the first period and a second period following the first period.

Meanwhile, the interface may receive the wireless channel information at the first interval after receiving the power-on signal, and receive the wireless channel information at a second interval less than the first interval when pairing with the remote control device is not completed within a predetermined period.

Meanwhile, the signal processing device may control a setting screen for remote control of a set-top box or an external device to be displayed.

Effects of the Disclosure

A remote control device according to an embodiment of the present disclosure includes: a plurality of keys; an IR module configured to perform IR communication in response to a part of the plurality of keys; and an RF module configured to perform RF communication in response to another part of the plurality of keys, and the RF module transmits wireless channel information to an image display apparatus at a first interval, and when pairing with the image display apparatus is not completed, transmits the wireless channel information at a second interval less than the first interval. As a result, the wireless pairing can be stably performed in response to the surrounding communication environment. In particular, the success rate of the wireless pairing can be increased.

Meanwhile, the RF module may transmit a plurality of wireless channel information to the image display apparatus at the first interval, and when the pairing with the image display apparatus is not completed after transmitting the wireless channel information at the first interval, transmit the plurality of wireless channel information at the second interval. As a result, the wireless pairing can be stably performed in response to the surrounding communication environment.

Meanwhile, an interval for transmitting the plurality of wireless channel information upon transmitting the plurality of wireless channel information at the second interval may be less than an interval for transmitting the plurality of wireless channel information upon transmitting the plurality of wireless channel information at the first interval. As a result, the wireless pairing can be stably performed in response to the surrounding communication environment.

Meanwhile, when the pairing with the image display apparatus is terminated after transmitting the wireless channel information at the second interval, the RF module may transmit the wireless channel information at the second interval other than the first interval. As a result, the wireless pairing can be stably performed in response to the surrounding communication environment.

Meanwhile, the RF module may transmit the plurality of wireless channel information to the image display apparatus at the first interval again when the pairing with the image display apparatus is terminated after transmitting the wireless channel information at the second interval, and transmit the plurality of wireless channel information at the second interval when the pairing with the image display apparatus is not completed after transmitting the wireless channel information at the first interval. As a result, the wireless pairing can be stably performed in response to the surrounding communication environment.

Meanwhile, the IR module may transmit a power-on signal corresponding to a power key operation among the plurality of keys, and the RF module may transmit the wireless channel information to the image display apparatus at the first interval after transmitting the power-on signal, and transmit the wireless channel information at the second interval less than the first interval when the pairing with the image display apparatus is not completed within a predetermined period. As a result, the wireless pairing can be stably performed in response to the surrounding communication environment.

Meanwhile, after the pairing with the image display apparatus is completed, when a key corresponding to the RF communication among the plurality of keys operates, the RF module may output a RF signal corresponding to the key based on the RF communication, and when a key corresponding to the IR communication among the plurality of keys operates, the IR module may output an IR signal corresponding to the key based on the IR communication. As a result, after the pairing is completed, the remote control signal can be stably output.

Meanwhile, the RF module may not output the RF signal when a key corresponding to only the RF communication among the plurality of keys operates before the pairing with the image display apparatus is completed. As a result, the operation of the key corresponding to the RF communication is not performed.

Meanwhile, when a key corresponding to both the RF communication and the IR communication among the plurality of keys operates before the pairing with the image display apparatus is completed, the RF module may not output the RF signal, and the IR module may output an IR signal corresponding to the key based on the IR communication. As a result, the remote control signal can be stably output in response to a communication environment in which the operation is enabled.

Meanwhile, when a key corresponding to both the RF communication and the IR communication among the plurality of keys operates after the pairing with the image display apparatus is completed, the RF module may output the RF signal, and the IR module may not output the IR signal. As a result, the remote control signal can be stably output in response to a communication environment in which the operation is enabled.

Meanwhile, the IR module may output the IR signal when a key corresponding to only the IR communication among the plurality of keys operates before the pairing with the image display apparatus is completed. As a result, the remote control signal can be stably output in response to a communication environment in which the operation is enabled.

Meanwhile, the key corresponding to the RF communication among the plurality of keys may include a voice key, the key corresponding to the IR communication among the plurality of keys may include a power key, and the key corresponding to both the RF communication and the IR communication among the plurality of keys may include a channel control key, a volume control key, a number key, an OK key, and a color key. As a result, the remote control signal can be stably output in response to a communication environment in which the operation is enabled.

Meanwhile, the RF module may transmit the wireless channel information to the image display apparatus at the first interval before setting for remote control of a set-top box or an external device is completed, and transmit the wireless channel information at a second interval less than the first interval after the setting for remote control of the set-top box or the external device is completed. As a result, the set-top box or the external device can be stably remotely controlled using the image display apparatus.

Meanwhile, the RF module may transmit the wireless channel information to the image display apparatus at the first interval when a power saving mode is switched to a power saving mode release, and transmit the wireless channel information at the second interval less than the first interval when the pairing with the image display apparatus is not completed within a predetermined period. As a result, the wireless pairing can be stably performed in response to the communication environment in which the operation is enabled upon the power saving mode release. In particular, the success rate of the wireless pairing can be increased.

Meanwhile, in a state in which the transmission of the wireless channel information at the second interval in the RF module is performed at a predetermined number of times or more, when the pairing with the image display apparatus is not completed, the RF module may not output the RF signal, and the IR module may output the IR signal. As a result, when the wiring pairing is not performed, the remote control signal can be output through the IR communication.

A remote control device according to another embodiment of the present disclosure includes: a plurality of keys; an IR module configured to perform IR communication in response to a part of the plurality of keys; and an RF module configured to perform RF communication in response to another part of the plurality of keys, and the RF module transmits wireless channel information to an image display apparatus at a first interval before setting for remote control of a set-top box or an external device is completed, and transmits the wireless channel information at a second interval less than the first interval after the setting for remote control of the set-top box or the external device is completed. As a result, the set-top box or the external device can be stably remotely controlled using the image display apparatus. In particular, the set-top box or the external device can be stably remotely controlled in response to a surrounding communication environment. Further, the success rate of the wireless pairing can be increased.

An image display apparatus according to an embodiment of the present disclosure includes: a display; a signal processing device configured to output an image signal to the display; a remote control device; and an interface configured to perform communication with the remote control device. As a result, the wireless pairing can be stably performed in response to the surrounding communication environment. In particular, the success rate of the wireless pairing can be increased.

Meanwhile, the interface may perform wireless pairing with the remote control device based on the wireless channel information received during a first period between the first period and a second period following the first period. As a result, the wireless pairing can be stably performed in response to the surrounding communication environment.

Meanwhile, the interface may receive the wireless channel information at the first interval after receiving the power-on signal, and receive the wireless channel information at a second interval less than the first interval when pairing with the remote control device is not completed within a predetermined period. As a result, the wireless pairing can be stably performed in response to the surrounding communication environment.

Meanwhile, the signal processing device may control a setting screen for remote control of a set-top box or an external device to be displayed. As a result, setting for remote control of the set-top box or the external device can be conveniently performed.

BRIEF DESCRIPTION OF THE DRAWINGS

FIGS. 7A to 11B are diagrams referred to in description of the operation methods of FIG. 6.

DETAILED DESCRIPTION OF THE PREFERRED EMBODIMENTS

Hereinafter, the present disclosure will be described in more detail with reference to the drawings.

Suffixes "module" and "unit" for components used in the following description are given in consideration of easy preparation of the specification only and do not have their own particularly important meanings or roles. Accordingly, the "module" and "unit" may be used interchangeably.

Figure 1:
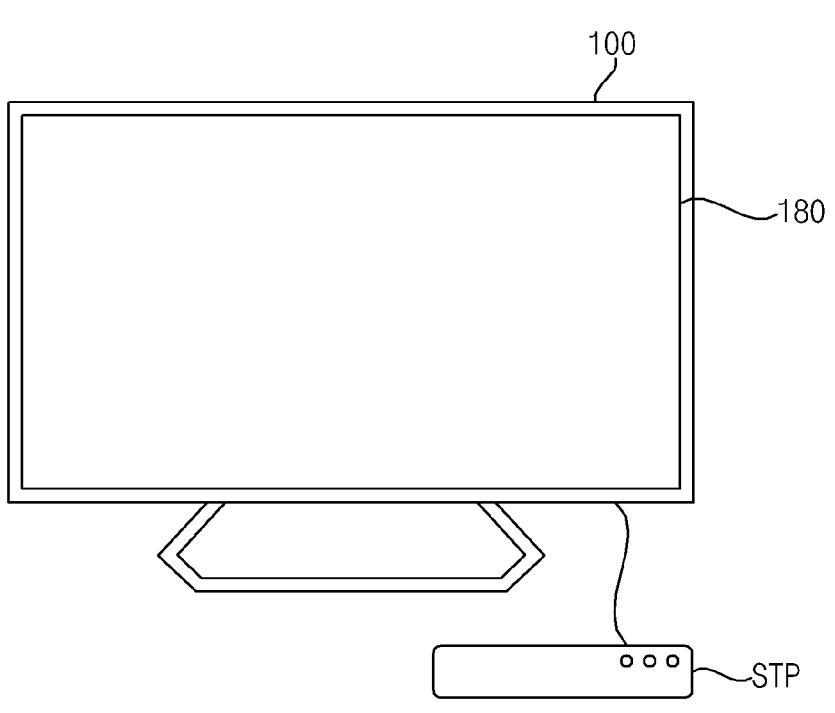
FIG. 1 is a diagram illustrating a remote control device and an image display apparatus according to an embodiment of the present disclosure.
Figure 1:
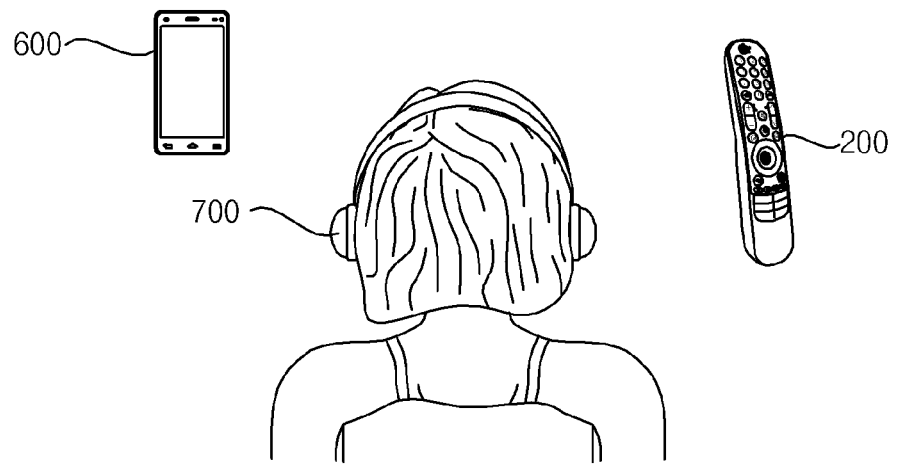

FIG. 1 illustrates one example of a diagram illustrating a remote control device and an image display apparatus according to an embodiment of the present disclosure.

Referring to the drawing, an image display apparatus 100 according to an embodiment of the present disclosure may include a display 180 for displaying an image and a remote control device 200 for remote control.

The remote control device 200 according to an embodiment of the present disclosure includes an IR module (reference numeral 423 of FIG. 5B) performing IR communication and an RF module (reference numeral 421 of FIG. 5B) performing RF communication.

For example, when a power key (reference numeral 201 of FIG. 2) of the remote control device 200 operates, a power-on signal may be wirelessly transmitted through the IR module (reference numeral 423 of FIG. 5B), and the image display apparatus 100 may receive the power-on signal, and turn on a power. As a result, the power is supplied to the display 180 to display a predetermined image.

Meanwhile, when a voice key (reference numeral 207 of FIG. 2) of the remote control device 200 operates, voice related information may be wirelessly transmitted through the RF module (reference numeral 421 of FIG. 5B), and the image display apparatus 100 may receive the voice related information, and perform a corresponding operation.

Meanwhile, when the wireless pairing is performed between a mobile terminal 600 and an earphone 700, the earphone 700 may receive audio data from the mobile terminal 600, and process the audio data and output a sound.

For the wireless pairing between the mobile terminal 600 and the earphone 700, the RF communication is used, and the RF communication between the mobile terminal 600 and the earphone 700 influences the RF communication between the remote control device 200 and the image display apparatus 100.

For example, a wireless pairing success rate between the remote control device 200 and the image display apparatus 100 may be lowered.

Accordingly, the present disclosure proposes a method which may stably perform the wireless pairing between the remote control device 200 and the image display apparatus 100 in response to the surrounding communication environment by increasing the wireless pairing success rate.

To this end, the remote control device 200 according to an embodiment of the present disclosure includes a plurality of keys 201 to 211, an IR module 423 performing the IR communication in response to a part of the plurality of keys 201 to 211, and an RF module 421 performing the RF communication in response to another part of the plurality of keys 201 to 211, and the RF module 421 transmits wireless channel information to the image display apparatus 100 at a first interval Tivy, and transmits the wireless channel information at a second interval Tivb less than the first interval Tivy when pairing with the image display apparatus 100 is not completed. As a result, the wireless pairing can be stably performed in response to the surrounding communication environment. In particular, the success rate of the wireless pairing can be increased.

Meanwhile, the remote control device 200 according to another embodiment of the present disclosure includes a plurality of keys 201 to 211, an IR module 423 performing the IR communication in response to a part of the plurality of keys 201 to 211, and an RF module 421 performing the RF communication in response to another part of the plurality of keys 201 to 211, and the RF module 421 transmits wireless channel information to the image display apparatus 100 at a first interval Tivy before setting completion for remote control of a set-top box STP or an external device (not illustrated) and transmits the wireless channel information at a second interval Tivb less than the first interval Tivy after the setting completion for the remote control of the set-top box STP or the external device (not illustrated). As a result, the set-top box STP can be stably controlled using the image display apparatus 100. In particular, the set-top box STP can be stably remotely controlled in response to the surrounding communication environment. Further, the success rate of the wireless pairing can be increased.

Meanwhile, as the image display apparatus 100 of FIG. 1, a TV, a monitor, a tablet PC, or a vehicle display apparatus is available.

Figure 2:
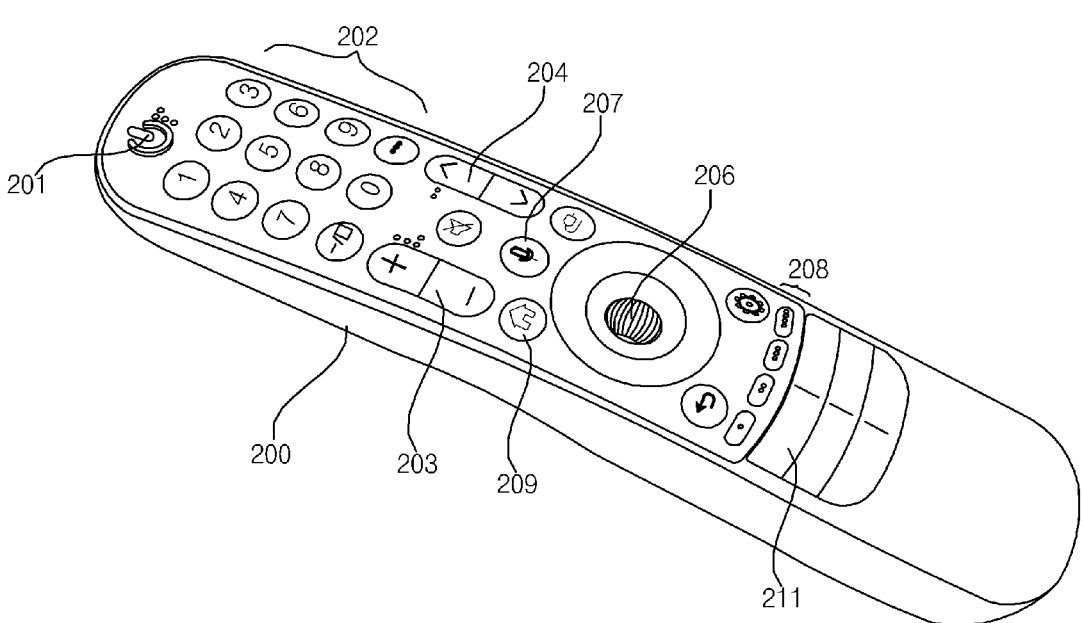
FIG. 2 is an enlarged diagram of the remote control device of FIG. 1.

FIG. 2 is an enlarged diagram of the remote control device of FIG. 1.

Referring to the drawing, the remote control device 200 according to an embodiment of the present disclosure may include a plurality of keys.

For example, the remote control device 200 may include a power key 201, a number key 202, a volume control key 203, a channel control key 204, an OK key 206, a voice key 207, a color key 208, a home key 209, etc.

The power key 201 is used for power on/off of the image display apparatus 100.

For example, in a state in which the power of the image display apparatus 100 is turned on, when the power key 201 operates, the power-on signal may be wirelessly transmitted to the image display apparatus 100.

In the state in which the power of the image display apparatus 100 is turned on, when the power key 201 operates, a power-off signal may be wirelessly transmitted to the image display apparatus 100.

The number key 202 is used for inputting a number such as a channel number, etc. In the drawing, number keys of 0 to 9 are illustrated.

The volume control key 203 is used for volume-up or volume-down of the image display apparatus 100.

The channel control key 204 is used for channel-up or channel-down of the image display apparatus 100.

The OK key 206 operates for selecting or confirming a predetermined item displayed in the image display apparatus 100.

Meanwhile, the OK key 206 may be implemented in a wheel key form. For example, the OK key 206 operates as a wheel key, and can operate up and down, and as a result, a screen or items of the image display apparatus 100 may be moved up and down and displayed.

Meanwhile, four-way keys for up, down, and left and right movement of a pointer or a cursor may be disposed around the OK key 206.

The voice key 207 may operate for voice recognition of a user.

The color key 208 may include keys indicating a plurality of colors, and may operate for shortening each set operation.

The home key 209 is used for displaying a home screen when the home screen of the image display apparatus 100 is set.

Other search keys may be used for displaying a search window in the image display apparatus or for performing a search at the time of inputting a search word.

Meanwhile, a back key is used for moving to a back screen and a back item displayed in the image display apparatus 100.

Meanwhile, a menu key is used for displaying a set menu of the image display apparatus 100. A pointer key 225 is used for displaying a pointer in the image display apparatus 100.

Meanwhile, in the drawing, additionally, a pointer key for displaying the pointer, a guide key for displaying a guide, a silent key, etc., are further illustrated.

Meanwhile, it may be set so that a part of the plurality of keys illustrated in FIG. 2 are capable of only the IR communication, another some are capable of only the RF communication, and the other some are capable of both the IR communication and the RF communication.

For example, the voice key 207 may be a key corresponding to the RF communication, the power key 201 may be a key corresponding to the IR communication, and the channel control key 204, the volume control key 203, the number key 202, the OK key 206, and the color key 208 may be keys corresponding to both the RF communication and the IR communication.

Meanwhile, an RF communication scheme between the remote control device 200 and the image display apparatus 100 may be a Bluetooth communication scheme, and is not limited thereto, and various modifications can be made such as a WiFi communication scheme, etc.

Figure 3:
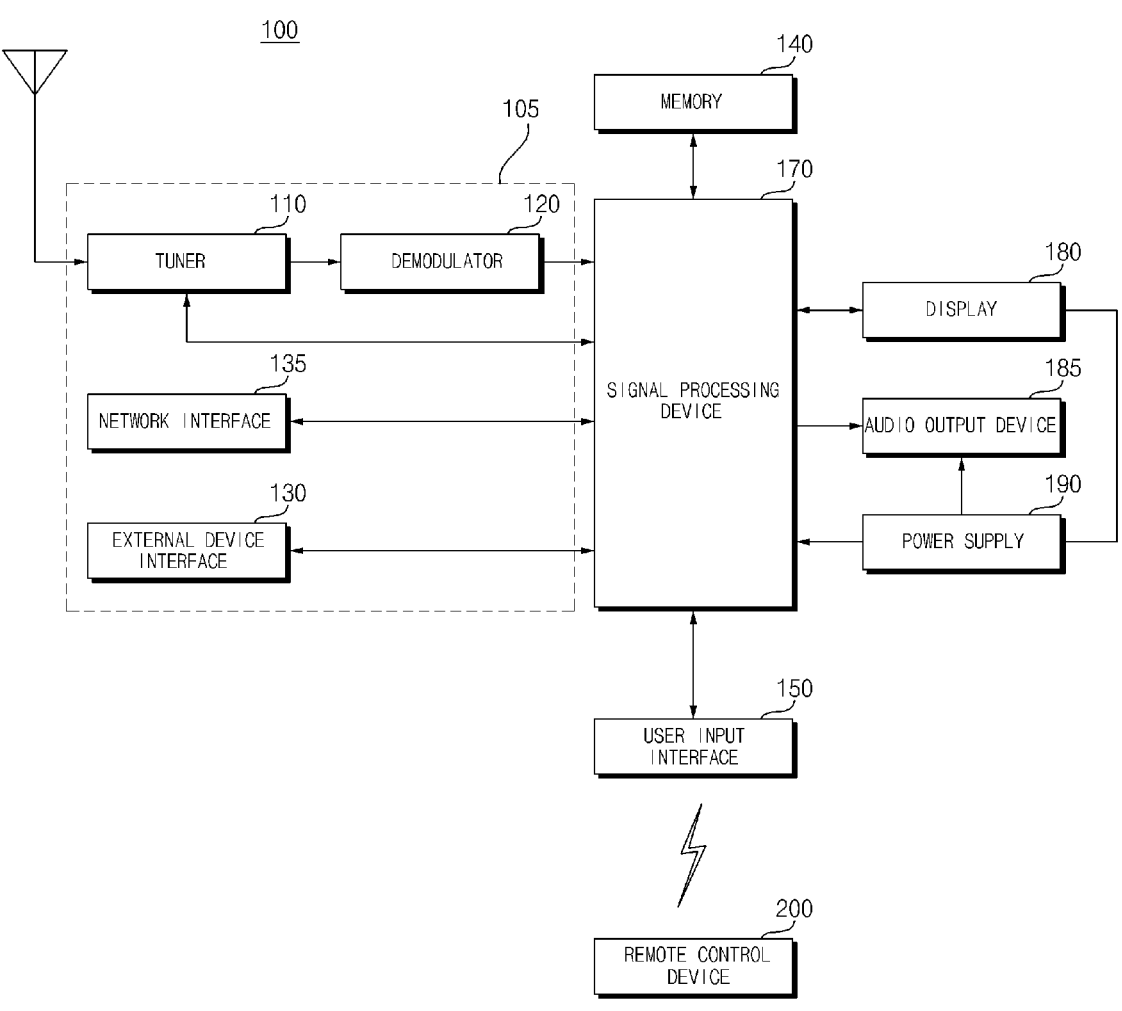
FIG. 3 illustrates one example of an internal block diagram of the image display apparatus of FIG. 1.

FIG. 3 illustrates one example of an internal block diagram of the image display apparatus of FIG. 1.

Referring to FIG. 3, the image display apparatus 100 according to an embodiment of the present disclosure may include an image reception device 105, an external device interface 130, a network interface 135, a memory 140, a user input interface 150, a sensor (not illustrated), a signal processing device 170, a display 180, and an audio output device 185.

The image reception device 105 may receive an input image. For example, the image reception device 105 may receive external input images such as a broadcasting image or an HDMI image, and a streamed image.

The image reception device 105 may include a tuner 110, a demodulator 120, the network interface 135, and the external device interface 130.

Meanwhile, the image reception device 105 may also include only the tuner 110, the demodulator 120, and the external device interface 130. That is, the image reception device 105 may not include the network interface 135.

The tuner 110 selects an RF broadcasting signal corresponding to a channel selected by a user or all pre-stored channels among radio frequency (RF) broadcasting signals received through an antenna (not illustrated). Further, the selected RF broadcasting signal is converted into an intermediate frequency signal or a baseband image or a voice signal.

Meanwhile, it is possible that the tuner 110 includes a plurality of tuners in order to receive a plurality of channels of broadcasting signals. Alternatively, a single tuner receiving the plurality of channels of broadcasting signals simultaneously is also available.

The demodulator 120 performs a demodulation operation by receiving a digital IF signal DIF converted by the tuner 110.

The demodulator 120 may perform demodulation and channel decoding, and then output a stream signal TS. In this case, the stream signal may be a signal generated by multiplexing the image signal, the voice signal, or a data signal.

The stream signal output by the demodulator 120 may be input into the signal processing device 170. The signal processing device 170 performs demultiplexing, image/voice signal processing, etc., and then outputs the image to the display 180 and outputs the voice to the audio output device 185.

The external device interface 130 may transmit or receive data to and from a connected external device (not illustrated), e.g., the set-top box 50.

To this end, the external device interface 130 may include an A/V input/output device (not illustrated), a wireless transceiver (not illustrated), etc.

The external device interface 130 may be connected to external devices such as a digital versatile disk (DVD), a Blu ray, a game machine, a camera, a camcorder, a computer (laptop), a set-top box, etc., wiredly/wirelessly, and may perform an input/output operation with the external device.

The A/V input/output device in the external interface 130 may receive the image and voice signals of the external device. Meanwhile, the wireless transceiver (not illustrated) in the external device interface 130 may perform short-range wireless communication with other electronic devices.

The external device interface 130 may exchange data with a neighboring mobile terminal 600 through the wireless transceiver (not illustrated). In particular, the external device interface 130 may receive device information, executed application information, an application image, etc., from the mobile terminal 600 in a mirroring mode.

The network interface 135 provides an interface for connecting the image display apparatus 100 to a wired/wireless network including an Internet network. For example, the network interface 135 may receive contents or data provided by an Internet or content provider or a network operator through the network.

Meanwhile, the network interface 135 may include the wireless transceiver (not illustrated).

The memory 140 may also store a program for each signal processing or control in the signal processing device 170, and store a signal-processed image, voice, or data signal.

Further, the memory 140 may also perform a function for temporarily storing the image, voice, or data signal input into the external device interface 130. Further, the memory 140 may store information on a predetermined channel through a channel storage function such as a channel map, etc.

An embodiment in which the memory 140 of FIG. 3 is provided separately from the signal processing device 170 is illustrated, but the scope of the present disclosure is not limited thereto. The memory 140 may be included in the signal processing device 170.

The user input interface 150 delivers a signal input by the user to the signal processing device 170 or delivers a signal from the signal processing device 170 to the user.

For example, the user input interface 150 may transmit/receive a user input signal such as power on/off, channel selection, screen setting, etc., to/from the remote control device 200, deliver a user input signal from a local key (not illustrated) such as the power key, the channel key, the volume key, a setting value, etc., to the signal processing device 170, deliver a user input signal input from a sensor (not illustrated) sensing a gesture of the user to the signal processing device 170, or transmit the signal from the signal processing device 170 to the sensor (not illustrated).

The signal processing device 170 demultiplexes a stream input through the tuner 110 or the demodulator 120 or the network interface 135 or the external device interface 130, or processes demultiplexed signals to generate and output a signal for image or voice output.

For example, the signal processing device 170 receives the broadcasting signal or the HDMI signal received by the image reception device 105, and performs signal processing based on the received broadcasting signal or HDMI signal to output a signal-processed image signal.

An image signal image-processed by the signal processing device 170 may be inputted into the display 180, and displayed as an image corresponding to the image signal. Further, the image signal image-processed by the signal processing device 170 may be output to an external output device through the external device interface 130.

A voice signal processed by the signal processing device 170 may be sound-outputted to the audio output device 185. Further, the voice signal processed by the signal processing device 170 may be output to the external output device through the external device interface 130.

Although not illustrated in FIG. 3, the signal processing device 170 may include a demultiplexer, an image processor, etc. That is, the signal processing device 170 may performs various signal processing, and as a result, the system may be implemented in a form of system on chip (SOC). This will be described below with reference to FIG. 4.

Besides, the signal processing device 170 may control an overall operation in the image display apparatus 100. For example, the signal processing device 170 controls the tuner 110 to control an RF broadcast corresponding to a channel selected by the user or a pre-stored channel to be tuned.

Further, the signal processing device 170 may control the image display apparatus 100 by a user command or an internal program input through the user input interface 150.

Meanwhile, the signal processing device 170 may control the display 180 to display the image. In this case, the image displayed in the display 180 may be a still image or a moving picture, and a 2D image or a 3D image.

Meanwhile, the signal processing device 170 may allow a predetermined object to be displayed in the image displayed in the display 180. For example, the object may be at least one of a connected web screen (newspaper, magazine, etc.), an electronic program guide (EPG), various menus, widgets, icons, the still image, the moving picture, or a text.

Meanwhile, the signal processing device 170 may recognize a position of the user based on an image photographed by a photographing device (not illustrated). For example, a distance (z-axis coordinates) between the user and the image display apparatus 100 may be determined. Besides, an x-axis coordinate and a y-axis coordinate in the display 180, which correspond to the user position may be determined.

The display 180 converts an image signal, a data signal, an OSD signal, and a control signal processed by the signal processing device 170 or an image signal, a data signal, and a control signal received by the external device interface 130 to generate a driving signal.

Meanwhile, it is also possible that the display 180 is configured as a touch screen, and used as an input device in addition to an output device.

The audio output device 185 receives a signal voice-processed by the signal processing device 170, and outputs the signal as the voice.

The photographing device (not illustrated) photographs the user. It is possible that the photographing device (not illustrated) is implemented as one camera, but is not limited thereto, and it is also possible that the photographing device (not illustrated) is implemented as a plurality of cameras. Image information photographed by the photographing device (not illustrated) may be input into the signal processing device 170.

The signal processing device 170 may sense the gesture of the user based on each of the image photographed by the photographing device (not illustrated) or the signal sensed by the sensor (not illustrated) or a combination thereof.

Meanwhile, the signal processing device 170 may be implemented in the form of system on chip (SOC).

The power supply 190 supplies the power throughout the image display apparatus 100. In particular, the power supply 190 may supply the power to the signal processing device 170 implemented as the form of the system on chip (SOC), the display 180 for displaying the image, and the audio output device 185 for audio output.

Specifically, the power supply 190 may include a converter converting alternating current (AC) power into direct current (DC) power, and a dc/dc converter converting a level of the DC power.

The remote control device 200 transmits the user input to the user input interface 150. To this end, the remote control device 200 may use Bluetooth, radio frequency (RF) communication, infrared (IR) communication, Ultra Wideband (UWB), a ZigBee scheme, etc. Further, the remote control device 200 may receive an image, voice or data signal output by the user input interface 150, and display or voice-output the signal in the remote control device 200.

Meanwhile, the image display apparatus 100 may be a fixed or mobile digital broadcast receivable digital broadcast receiver.

Meanwhile, the block diagram of the image display apparatus 100 illustrated in FIG. 3 is a block diagram for an embodiment of the present disclosure. Respective components of the block diagram may be integrated, added, or omitted according to a specification of the image display apparatus 100 which is actually implemented. That is, two or more components may be combined into one component or one component may be divided into two or more components as necessary. Further, a function performed in each block is for describing the embodiment of the present disclosure, and specific operations or devices thereof do not limit the scope of the present disclosure.

Figure 4:
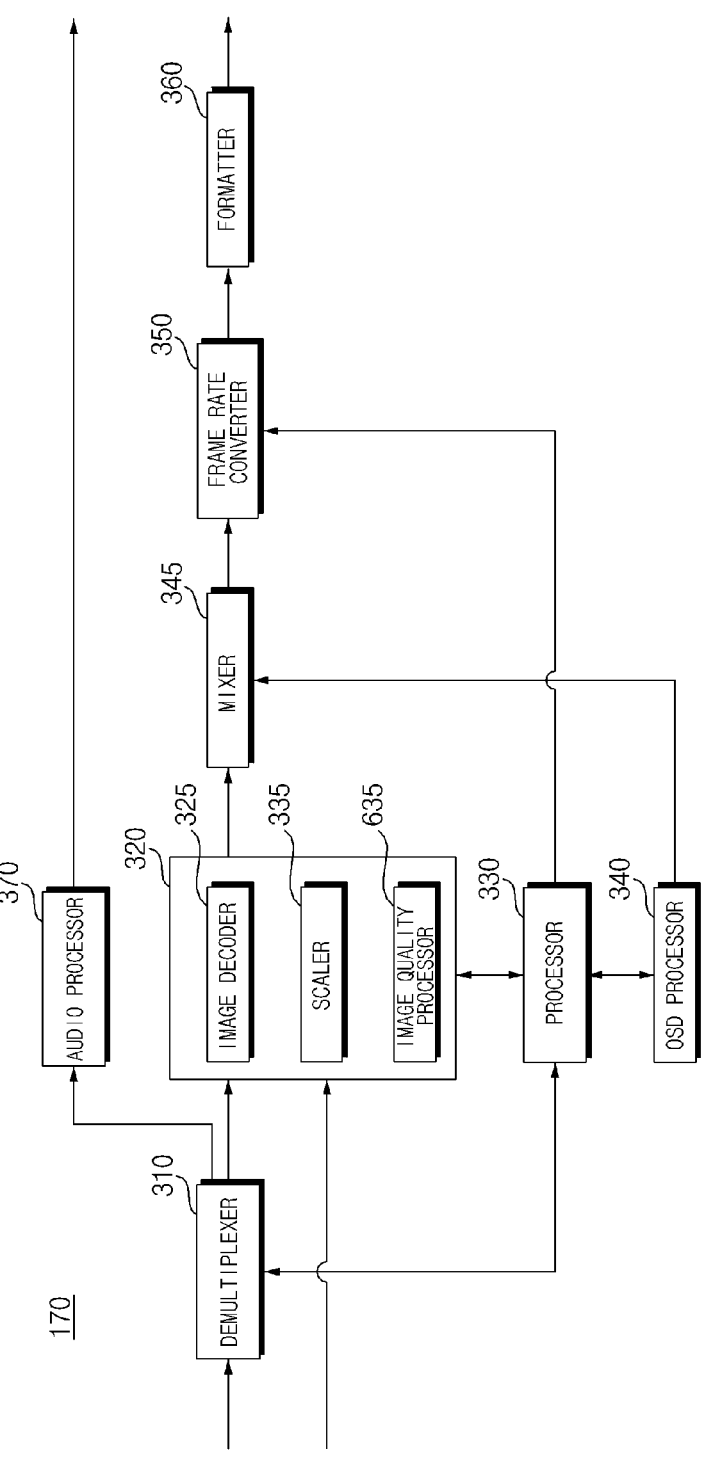
FIG. 4 illustrates one example of an internal block diagram of a signal processing device of FIG. 3.

FIG. 4 illustrates one example of an internal block diagram of a signal processing device of FIG. 3.

When described by referring to the drawing, the signal processing device 170 according to an embodiment of the present disclosure may include a demultiplexer 310, an image processor 320, a processor 330, and an audio processor 370. Besides, the signal processing device 170 may further include a data processor (not illustrated).

The demultiplexer 310 demultiplexes an input stream. For example, when MPEG-2 TS is input, MPEG-2 TS may be demultiplexed, and separated into each of image, voice, and data signals. Here, the stream signal input into the demultiplexer 310 may be a stream signal output from the tuner 110, the demodulator 120, or the external device interface 130.

The image processor 320 may perform signal-processing for the input image. For example, the image processor 320 may perform image-processing of the image demultiplexed by the demultiplexer 310.

To this end, the image processor 320 may include an image decoder 325, a scaler 335, an image quality processor 635, an image encoder (not illustrated), an OSD processor 340, a frame rate converter 350, and a formatter 360.

The image decoder 325 decodes the demultiplexed image signal, and the scaler 335 performs scaling to enable the display 180 to output a resolution of the decoded image signal.

The image decoder 325 is capable of including various specifications of decoders. For example, the image decoder 325 may include MPEG-2, an H,264 decoder, a 3D image decoder for a color image and a depth image, a decoder for multiple viewpoint images, etc.

The scaler 335 may scale the input image signal for which image decoding is completed in the image decoder 325.

For example, the scaler 335 may up-scale the input image signal when the size or resolution of the input image signal is small and down-scale the input image signal when the size or resolution of the input image signal is large.

The image quality processor 635 may perform quality-processing for the input image signal for which image decoding is completed in the image decoder 325.

For example, the image quality processor 635 may perform noise removal processing of an input image signal, extend a resolution of a gray scale of the input image signal, enhance an image resolution, perform high dynamic range (HDR) based signal processing, vary a frame rate, or process panel characteristics, in particular, image quality processing corresponding to an organic light emitting panel.

The OSD processor 340 generates an OSD signal according to a user input or autonomously. For example, the OSD processor 340 may generate a signal for displaying various information on the screen of the display 180 as a graphic or text. The generated OSD signal may include various data including a user interface screen, various menu screens, widgets, icons, etc., of the image display apparatus 100. Further, the generated OSD signal may include a 2D object or a 3D object.

Further, the OSD processor 340 may generate a pointer displayable in the display based on a pointing signal input from the remote control device 200. In particular, the pointer may be generated by a pointing signal processing device, and the OSD processor 240 may include the pointing signal processing device (not illustrated). Of course, it is also possible that the pointing signal processing device (not illustrated) is not provided in the OSD processor 240, but is separately provided.

The frame rate converter (FRC) 350 may convert the frame rate of an input image. Meanwhile, it is also possible that the frame rate converter 350 outputs the frame rate as it is without separate frame rate conversion.

Meanwhile, the formatter 360 may change a format of the input image signal to the image display to be displayed in the display, and output the image signal.

In particular, the formatter 360 may change the format of the image signal to correspond to a display panel.

Meanwhile, the formatter 360 may also change the format of the image signal. For example, the formatter 360 may change a format of a 3D image signal into any one format of various 3D formats including a side by side format, a top/down format, a frame sequential format, an interlaced format, a checker box format, etc.

The processor 330 may control an overall operation in the image display apparatus 100 or the signal processing device 170.

For example, the processor 330 controls the tuner 110 to tune an RF broadcast corresponding to a channel selected by the user or a pre-stored channel.

Further, the processor 330 may control the image display apparatus 100 by a user command or an internal program input through the user input interface 150.

Further, the processor 330 may perform data transmission control with the network interface 135 or the external device interface 130.

Further, the processor 330 may control operations of the demultiplexer 310, the image processor 320, etc., in the signal processing device 170.

Meanwhile, the audio processor 370 in the signal processing device 170 may perform voice-processing of the demultiplexed voice signal. To this end, the audio processor 370 may include various decoders.

Further, the audio processor 370 in the signal processing device 170 may process a base, a treble, volume control, etc.

A data processor (not illustrated) in the signal processing device 170 may perform data-processing of the demultiplexed data signal. For example, when the demultiplexed data signal is an encoded data signal, this may be decoded. The encoded data signal may be electronic program guide information including a start time, an end time, etc., of a broadcasting program broadcasted in each channel.

Meanwhile, the block diagram of the signal processing device 170 illustrated in FIG. 4 is a block diagram for an embodiment of the present disclosure. Respective components of the block diagram may be integrated, added, or omitted according to a specification of the signal processing device 170 which is actually implemented.

In particular, the frame rate converter 350 and the formatter 360 may be provided separately apart from the image processor 320.

Figure 5A:
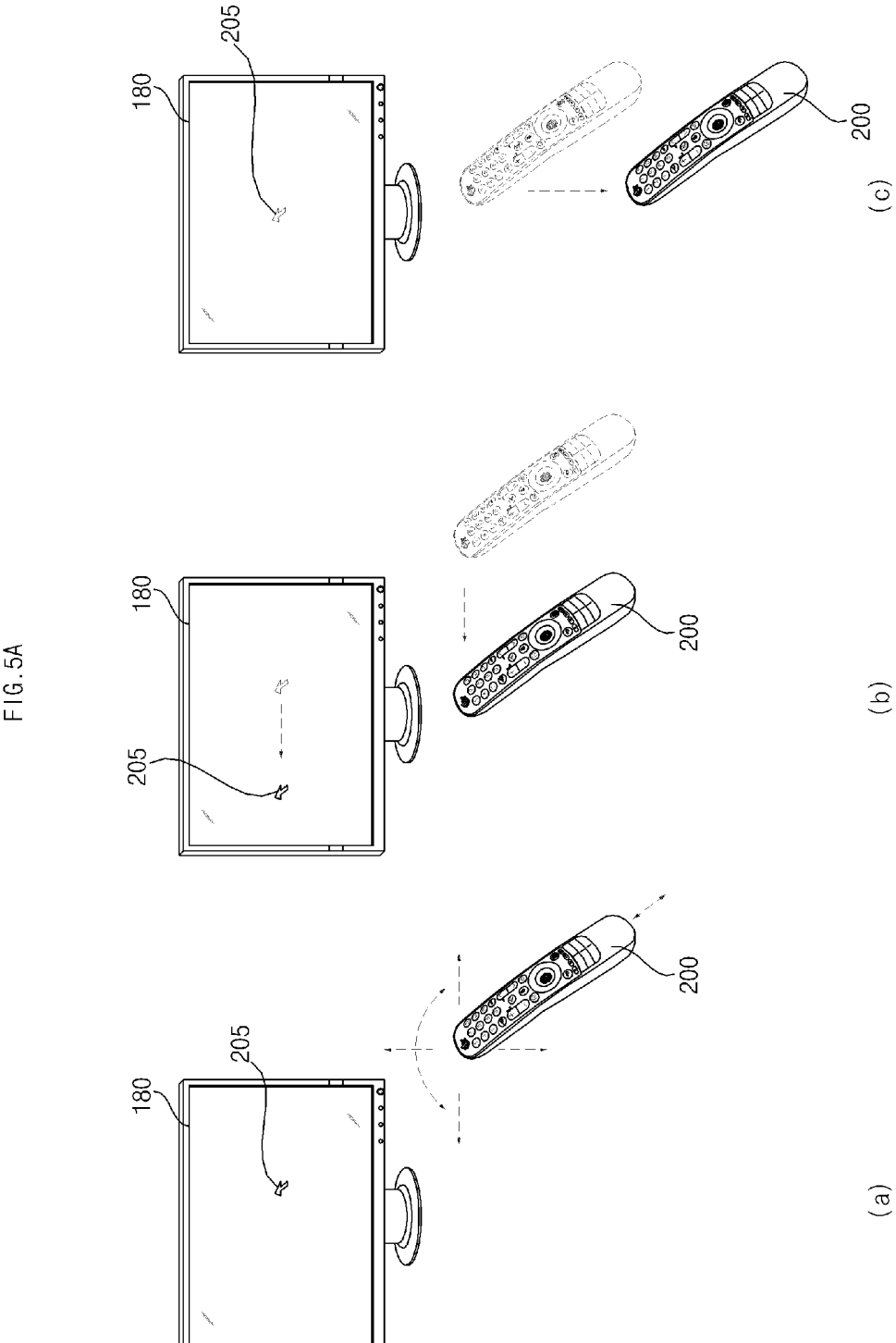
FIG. 5A is a diagram illustrating a control method of the remote control device of FIG. 3.

FIG. 5A is a diagram illustrating a control method of the remote control device of FIG. 3.

As illustrated in (a) of FIG. 5A, it is illustrated that a pointer 205 corresponding to the remote control device 200 is displayed in the display 180.

The user may move or rotate the remote control device 200 up and down, left and right ((b) of FIG. 5A), or forward or backward ((c) of FIG. 5A). The pointer 205 displayed in the display 180 of the image display apparatus corresponds to movement of the remote control device 200. The remote control device 200 may be referred to as a space remote controller or a 3D pointing device because the pointer 205 is moved and displayed according to a movement in a 3D space as illustrated in the drawing.

(b) of FIG. 5A illustrates that when the user moves the remote control device 200 to the left, the pointer 205 displayed in the image display apparatus also moves to the left in response thereto.

Information on the movement of the remote control device 200 sensed through the sensor of the remote control device 200 is transmitted to the image display apparatus. The image display apparatus may calculate coordinates of the pointer 205 from the information on the movement of the remote control device 200. The image display apparatus may display the pointer 205 to correspond to the calculated coordinates.

(c) of FIG. 5A illustrates a case where in a state of pressing a specific button in the remote control device 200, the user moves the remote control device 200 to be far away from the display 180. Therefore, a tuning area in the display 180 corresponding to the pointer 205 may be zoomed in, and enlarged and displayed. Contrary to this, when the user moves the remote control device 200 to be close to the display 180, the tuning area in the display 180 corresponding to the pointer 205 may be zoomed out, and reduced and displayed. Meanwhile, when the remote control device 200 is far away from the display 180, the tuning area may be zoomed out and when the remote control device 200 is close to the display 180, the tuning area may also be zoomed in.

Meanwhile, in the state of pressing the specific button in the remote control device 200, recognition of up and down, and left and right movement may be excluded. That is, when the remote control device 200 moves to be far away from or close to the display 180, the up and down, and left and right movement may not be recognized, and only forward and backward movement may be recognized. In a state of not pressing the specific button in the remote control device 200, only the pointer 205 moves according to the up and down, and left and right movement of the remote control device 200.

Meanwhile, a movement speed or movement direction of the pointer 205 may correspond to the movement speed or movement direction of the remote control device 200.

Figure 5B:
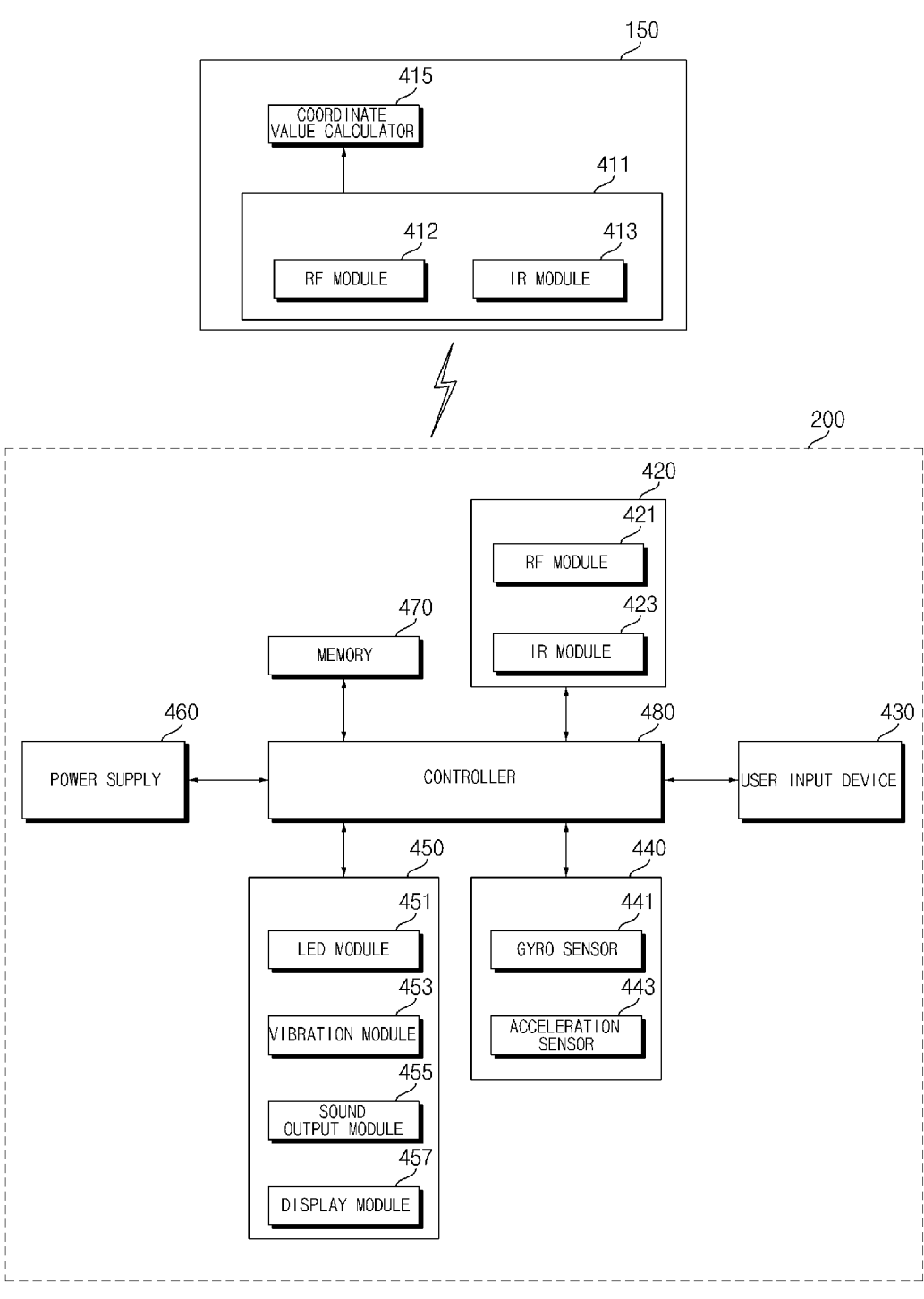
FIG. 5B is an internal block diagram of the remote control device of FIG. 3.

FIG. 5B is an internal block diagram of the remote control device of FIG. 3.

When described by referring to the drawing, the remote control device 200 may include a wireless transceiver 420, a user input device 435, an output device 450, a power supply 460, a memory 470, and a controller 480.

The wireless transceiver 420 transmits and receives the signals to and from the image display apparatus according to the embodiments of the present disclosure described above.

In the embodiment, the wireless transceiver 420 in the remote control device 200 may include an RF module 421 which may transmit and receive the signals to and from the image display apparatus 100 according to an RF communication specification. Further, the wireless transceiver 420 in the remote control device 200 may include an IR module 421 which may transmit and receive the signals to and from the image display apparatus 100 according to an IR communication specification.

In the embodiment, the remote control device 200 transmits a signal containing the information on the movement of the remote control device 200 to the image display apparatus 100 through the RF module 421.

Further, the remote control device 200 may receive the signal transmitted by the image display apparatus 100 through the RF module 421.

Further, the remote control device 200 may transmit commands related to power on/off, channel change, volume change, etc., to the image display apparatus 100 through the IR module 423 as necessary.

The user input device 435 may include a key pad, a button, a touch pad, or a touch screen. The user manipulates the user input device 435 to input a command related to the image display apparatus 100 into the remote control device 200. When the user input device 435 includes a hard key button, the user may input a command related to the image display apparatus 100 into the remote control device 200 through a push operation of the hard key button. When the user input device 435 includes the touch screen, the user may input the command related to the image display apparatus 100 into the remote control device 200 by touching a soft key of the touch screen. Further, the user input device 435 may include various types of input means which may be manipulated by the user, such as a scroll key or a jog key, and does not limit the scope of the present disclosure in the embodiment.

The sensor 440 may include a gyro sensor 441 or an acceleration sensor 443. The gyro sensor 441 may sense the information on the movement of the remote control device 200.

As an example, the gyro sensor 441 may sense the information on the operation of the remote control device 200 based on x, y, and z axes. The acceleration sensor 443 may sense information on the movement speed of the remote control device 200. Meanwhile, the sensor 440 may further include a distance measurement sensor, and as a result, may sense a distance from the display 180.

The output device 450 may output an image or voice signal corresponding to manipulation of the user input device 435 or corresponding to the signal transmitted by the image display apparatus 100. The user may recognize whether to manipulate the user input device 435 or whether to control the image display apparatus 100 through the output device 450.

As an example, the output device 450 may include an LED module 451 lighted when the user input device 435 is manipulated or the signals are transmitted to and received form the image display apparatus 100 through the wireless transceiver 425, a vibration module 453 generating vibration, a sound output module 455 outputting a sound, or a display module 457 outputting the image.

The power supply 460 supplies power to the remote control device 200. The power supply 460 stops power supply to reduce power waste when the remote control device 200 does not move for a predetermined time. The power supply 460 may resume the power supply when a predetermined key provided in the remote control device 200 is manipulated.

The memory 470 may store various types of programs, application data, etc., required for the control or the operation of the remote control device 200. When the remote control device 200 wirelessly transmits and receives the signal to and from the image display apparatus 100 through the RF module 421, the remote control device 200 and the image display apparatus 100 transmit and receive signals through a predetermined frequency band. The controller 480 of the remote control device 200 may store and refer to information on a frequency band through which the signals may be wirelessly transmitted to and received from the image display apparatus 100 paired with the remote control device 200 in the memory 470.

The controller 480 controls all matters related to the control of the remote control device 200. The controller 480 may transmit, to the image display apparatus 100, a signal corresponding to predetermined key manipulation of the user input device 435 or a signal corresponding to the movement of the remote control device 200 sensed by the sensor 440 through the wireless transceiver 425.

The user input interface 150 of the image display apparatus 100 may include a wireless transceiver 411 which may wirelessly transmit and receive a signal to and from the remote control device 200, and a coordinate value calculator 415 which may calculate a coordinate value of a pointer corresponding to the operation of the remote control device 200.

The user input interface 150 may wirelessly transmit and receive the signal to and from the remote control device 200 through the RF module 412. Further, the user input interface 150 may receive the signal which the remote control device

200 transmits according to the IR communication specification through the IR module 413.

The coordinate value calculator 415 may calculate a coordinate value (x, y) of the pointer 205 to be displayed in the display 170 by correcting hand trembling or an error from the signal corresponding to the operation of the remote control device 200 received through the wireless transceiver 411.

A transmission signal of the remote control device 200 input into the image display apparatus 100 through the user input interface 150 is transmitted to the signal processing device 170 of the image display apparatus 100. The signal processing device 170 may discriminate information on the operation and the key manipulation of the remote control device 200 from the signal transmitted by the remote control device 200, and control the image display apparatus 100 in response thereto.

As another example, the remote control device 200 may calculate a pointer coordinate value corresponding to the operation, and output the pointer coordinate value to the user input interface 150 of the image display apparatus 100. In this case, the user input interface 150 of the image display apparatus 100 may transmit information on the pointer coordinate value received without a separate hand trembling or error correction process to the signal processing device 170.

Further, as another example, it is also possible that the coordinate value calculator 415 is provided inside the signal processing device 170 other than the user input interface 150 unlike the drawing.

Figure 6:
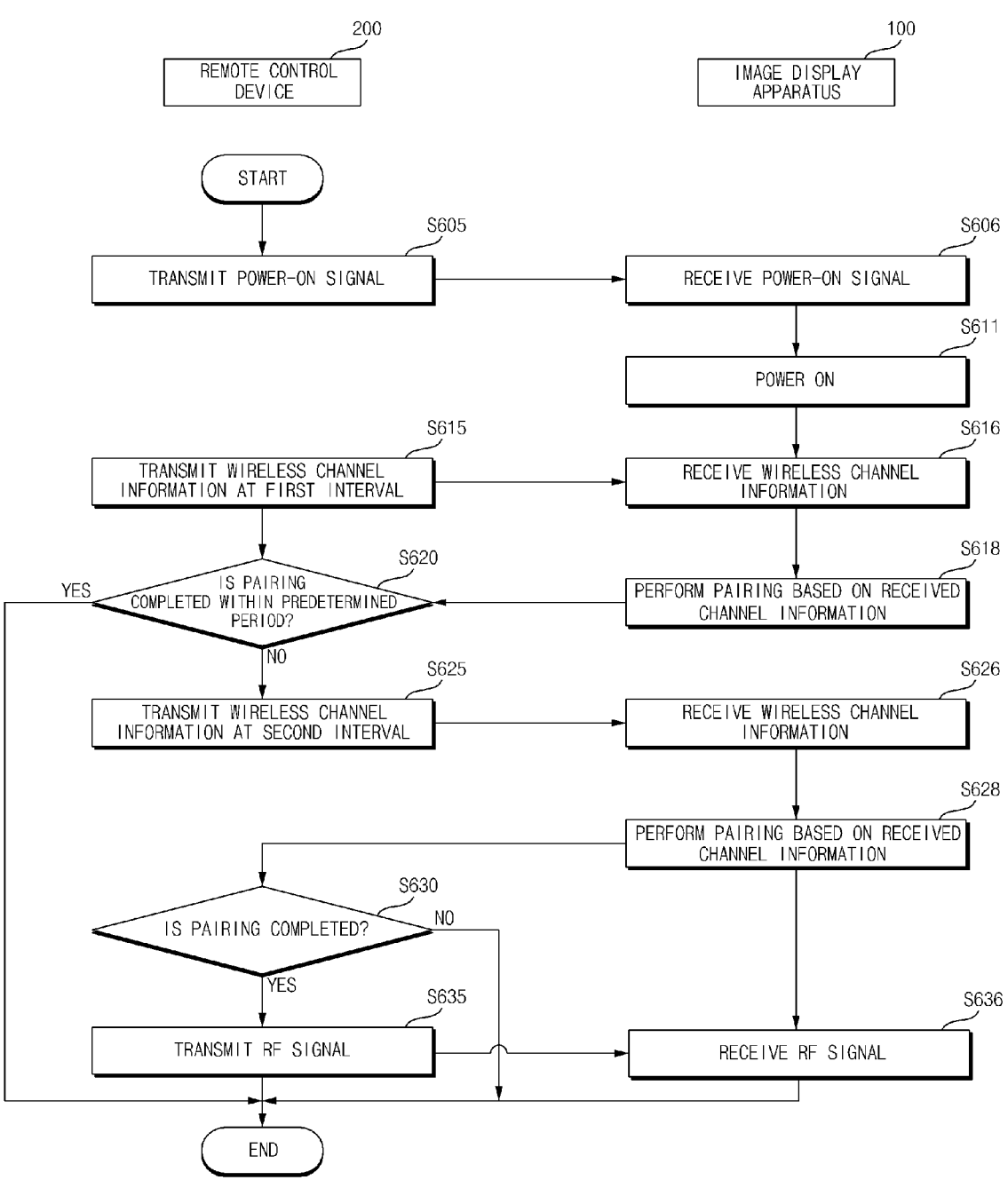
FIG. 6 is a flowchart illustrating one example of operation methods of the remote control device and the image display apparatus according to the embodiment of the present disclosure.

FIG. 6 is a flowchart illustrating one example of operation methods of the remote control device and the image display apparatus according to the embodiment of the present disclosure.

Referring to the drawing, when the power key 201 of the remote control device 200 operates, the IR module 423 of the remote control device 200 transmits a power-on signal by IR communication (S605).

In response thereto, the IR module 411 in the user input interface 150 of the image display apparatus 100 receives the power-on signal (S606).

The image display apparatus 100 may turn on a power of an internal device such as the power of the display 180 based on the received power-on signal (S611).

Next, according to the operation of the power key 201 of the remote control device 200, after the power of the image display apparatus 100 is turned on, the remote control device 200 may operate for wireless pairing with the image display apparatus 100.

Meanwhile, the remote control device 200 enters a power saving mode when not used during a predetermined period (e.g., approximately 15 seconds) in order to reduce power consumption of a battery (not illustrated) in the power supply 460, and in the power saving mode, when the key operation or a movement operation of the remote control device 200 is detected, the power saving mode is released.

The remote control device 200 may operate for the wireless pairing with the image display apparatus 100 when the power saving mode is switched to the power saving mode release.

That is, after the power key 201 operates, or when the power saving mode is switched to the power saving mode release, the remote control device 200 may operate for the wireless pairing with the image display apparatus 100.

To this end, the RF module 421 of the remote control device 200 transmits the wireless channel information to the image display apparatus 100 at the first interval Tivy (S615).

In this case, the wireless channel information may include a plurality of wireless channel information.

For example, the RF module 421 of the remote control device 200 may output the plurality of wireless channel information every approximately 30 ms which is the first interval Tivy during a period of 150 ms. Specifically, approximately 5 wireless channel information may be output during a period of approximately 150 ms.

Meanwhile, the plurality of wireless channel information may be transmitted to be spaced at a first channel interval.

Next, the RF module 412 in the user input interface 150 of the image display apparatus 100 receives the wireless channel information of the first interval Tivy (S616).

The wireless transceiver 411 of the image display apparatus 100 performs pairing based on the plurality of received wireless channel information (S618).

For example, the RF module 412 in the wireless transceiver 411 of the image display apparatus 100 may select channel information having a strongest signal strength RSSI among the plurality of wireless channel information, and transmit the selected channel information to the RF module 421 of the remote control device 200.

The RF module 421 of the remote control device 200 may receive the selected channel information, and complete pairing based thereon.

As a result, the wireless pairing based on the RF communication between the remote control device 200 and the image display apparatus 100 may be completed.

Meanwhile, the RF module 421 of the remote control device 200 determines whether the wireless pairing is completed within a predetermined period (S620), and when the wireless pairing is not completed during the predetermined period, transmits the wireless channel information at a second interval Tivb less than the first interval Tivy (S625).

That is, the RF module 421 of the remote control device 200 may transmit the plurality of wireless channel information to the image display apparatus 100 at the first interval Tivy, and when the pairing with the image display apparatus 100 is not completed after transmitting the wireless channel information at the first interval Tivy, transmit the plurality of wireless channel information at the second interval Tivb.

For example, the RF module 421 of the remote control device 200 may output the plurality of wireless channel information every approximately 2.5 ms which is the second interval Tivb during the period of 150 ms. Specifically, the wireless channel information may be output at approximately 60 times during the period of approximately 150 ms.

Meanwhile, the plurality of wireless channel information may be transmitted to be spaced at a second channel interval less than the first channel interval. As a result, the success rate of the wireless pairing can be increased.

Next, the RF module 412 in the user input interface 150 of the image display apparatus 100 receives the wireless channel information of the second interval Tivb (S626).

The wireless transceiver 411 of the image display apparatus 100 performs pairing based on the plurality of received wireless channel information (S628).

For example, the RF module 412 in the wireless transceiver 411 of the image display apparatus 100 may select channel information having a strongest signal strength RSSI among the plurality of wireless channel information, and transmit the selected channel information to the RF module 421 of the remote control device 200.

The RF module 421 of the remote control device 200 may receive the selected channel information, and complete pairing based thereon.

As a result, the wireless pairing based on the RF communication between the remote control device 200 and the image display apparatus 100 may be completed.

The RF module 421 of the remote control device 200 may determine whether the wireless pairing is completed (S630), and wirelessly transmit an RF signal when a key in which the RF communication is enabled operates in a state in which the wireless pairing is completed (S635).

In response thereto, the RF module 412 in the user input interface 150 of the image display apparatus 100 may wirelessly receive the RF signal (S636).

In addition, the signal processing device 170 of the image display apparatus 100 may control a corresponding operation to be performed based on the received RF signal.

For example, the signal processing device 170 of the image display apparatus 100 may control the corresponding operation to be performed after the voice recognition is performed when the received RF signal includes a voice signal for the operation of the voice key 207.

As another example, when the received RF signal includes the information on the movement of the remote control device 200, the signal processing device 170 of the image display apparatus 100 may control the pointer 205 to be displayed based on the information on the movement.

Meanwhile, when a key corresponding to the RF communication among the plurality of keys 201 to 211 operates after RF communication based wireless pairing between the remote control device 200 and the image display apparatus 100 is completed, the RF module 421 may output a RF signal corresponding to the key based on the RF communication, and when a key corresponding to the IR communication operates among the plurality of keys 201 to 211, the IR module 423 may output an IR signal corresponding to the key based on the IR communication.

For example, when the voice key 207 operates after the RF communication based wireless pairing between the remote control device 200 and the image display apparatus 100 is completed, the RF module 421 may output a RF signal corresponding to the key based on the RF communication.

As another example, when the power key 201 operates after the RF communication based wireless pairing between the remote control device 200 and the image display apparatus 100 is completed, the IR module 423 may output a power-off signal which is the corresponding IR signal.

Meanwhile, when a key corresponding to only the RF communication among the plurality of keys 201 to 211 operates before the RF communication based wireless pairing between the remote control device 200 and the image display apparatus 100 is completed, the RF module 421 of the remote control device 200 may not output the RF signal.

For example, when the voice key 207 operates before the RF communication based wireless pairing between the remote control device 200 and the image display apparatus 100 is completed, the RF module 421 may not output the corresponding RF signal.

As another example, when the remote control device 200 moves before the RF communication based wireless pairing between the remote control device 200 and the image display apparatus 100 is completed, the RF module 421 may not output the RF signal including the information on the movement.

Meanwhile, when a key corresponding to both the RF communication and the IR communication among the plurality of keys 201 to 211 operates before the RF communication based wireless pairing between the remote control device 200 and the image display apparatus 100 is completed, the RF module 421 may not output the RF signal, and the IR module 423 may output the corresponding IR signal.

For example, when any one of the channel control key 204, the volume control key 203, the number key 202, the OK key 206, and the color key 208 operates before the RF communication based wireless pairing between the remote control device 204 and the image display apparatus 100 is completed, the RF module 421 of the remote control device 200 may not output the RF signal, and the IR module 423 may output the IR signal.

Specifically, when the channel control key 204 operates before the RF communication based wireless pairing between the remote control device 200 and the image display apparatus 100 is completed, the IR module 200 of the remote control device 200 may output the IR signal for channel control.

Meanwhile, when a key in which both the IR communication and the RF communication are enabled operates after the RF communication based wireless pairing between the remote control device 200 and the image display apparatus 100 is completed, the remote control device 200 may transmit the RF signal based on the RF communication other than the IR communication.

For example, when any one of the channel control key 204, the volume control key 203, the number key 202, the OK key 206, and the color key 208 operates after the RF communication based wireless pairing between the remote control device 204 and the image display apparatus 100 is completed, the RF module 421 of the remote control device 200 may output the RF signal other than the IR signal.

Meanwhile, when a key corresponding to only the IR communication among the plurality of keys 201 to 211 operates before the RF communication based wireless pairing between the remote control device 200 and the image display apparatus 100 is completed, the IR module 423 of the remote control device 200 may output the IR signal.

For example, when the power key 201 operates before the RF communication based wireless pairing between the remote control device 200 and the image display apparatus 100 is completed, the IR module 423 may output the power-off signal which is the corresponding IR signal.

Meanwhile, when pairing with the image display apparatus 100 is terminated after the wireless channel information at the second interval Tivb, the RF module 421 may transmit the wireless channel information at the second interval Tivb other than the first interval Tivy.

For example, after the RF module 421 transmits the wireless channel information at the second interval Tivb, the RF communication based wireless pairing between the remote control device 200 and the image display apparatus 100 is performed, and then pairing with the image display apparatus 100 may be terminated due to power-off of the image display apparatus 100.

In addition, when the image display apparatus 100 is powered on again, the RF module 421 may immediately transmit the wireless channel information at the second interval Tivb which is successful previously other than the first interval Tivy which is unsuccessful previously. As a result, the wireless pairing can be rapidly performed in response to the surrounding communication environment.

Unlike this, when the pairing with the image display apparatus 100 is terminated after transmitting the wireless channel information at the second interval Tivb, the RF module 421 may transmit the plurality of wireless channel information to the image display apparatus 100 at the first interval Tivy again, and when the pairing with the image display apparatus 10 is not completed after transmitting the wireless channel information at the first interval Tivy, the RF module 421 may also transmit the plurality of wireless channel information at the second interval Tivb.

For example, after the RF module 421 transmits the wireless channel information at the second interval Tivb, the RF communication based wireless pairing between the remote control device 200 and the image display apparatus 100 is performed, and then the pairing with the image display apparatus 100 may be terminated due to the power-off of the image display apparatus 100.

In addition, when the image display apparatus 100 is powered on again, the second RF module 421 does not transmit the wireless channel information immediately at the second interval Tivb, but first transmits the wireless channel information at the first interval Tivy, and then when the wireless pairing is not completed within a predetermined period, the RF module 421 may transmit the wireless channel information at the second interval Tivb. As a result, the wireless pairing can be stably performed in response to the surrounding communication environment.

FIGS. 7A to 11B are diagrams referred to in description of the operation methods of FIG. 6.

Figure 7A:
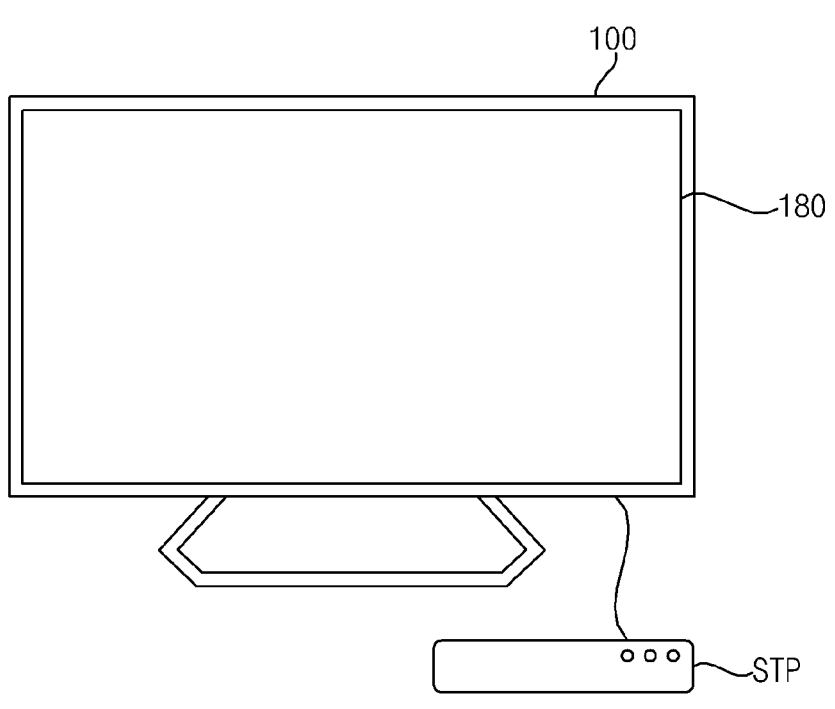
Figure 7A:
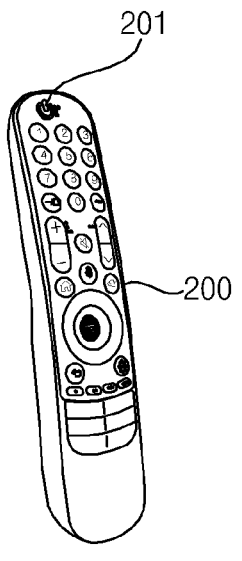

FIG. 7A illustrates that the set-top box STP and the image display apparatus 100 are connected wiredly, and the power key 201 of the remote control device 200 operates in a power-off state of the image display apparatus 100.

When the power key 201 of the remote control device 200 operates, the IR module 423 of the remote control device 200 transmits the power-on signal by the IR communication. In response thereto, the IR module 411 in the user input interface 150 of the image display apparatus 100 receives the power-on signal.

The image display apparatus 100 may turn on the power of the internal device such as the power of the display 180 based on the received power-on signal, and display a predetermined image in the display 180.

Figure 7B:
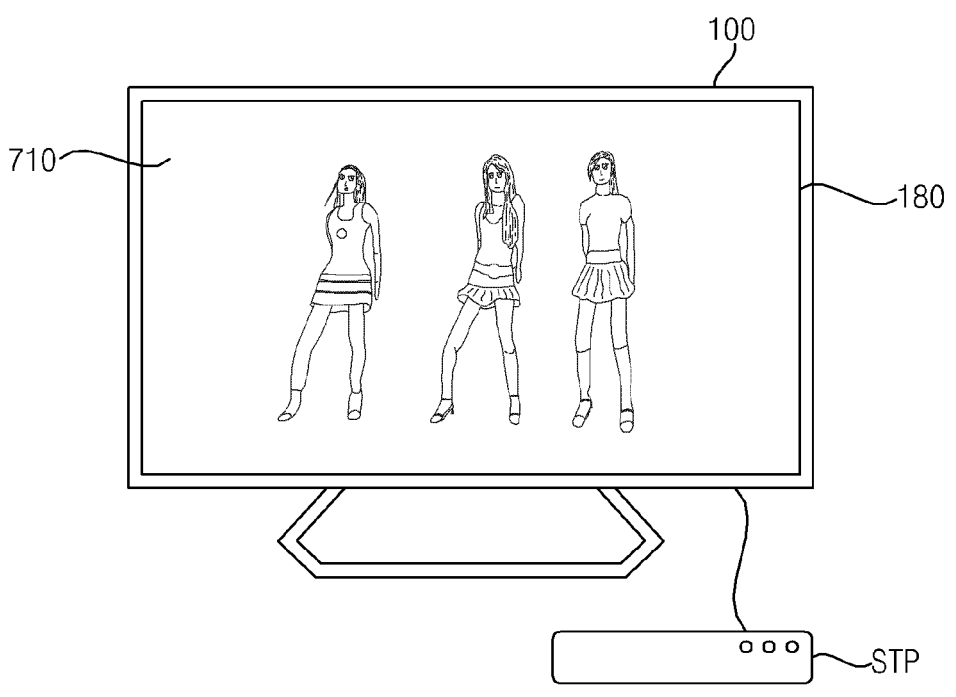
Figure 7B:
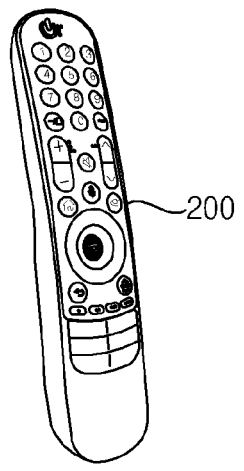

FIG. 7B illustrates that a predetermined image 710 is displayed in the display 180 according to the power-on.

The predetermined image 710 may be a broadcasting image received by the image display apparatus 100 or an external input image received by the set-top box STP.

Meanwhile, after the image display apparatus 100 is powered on, the remote control device 200 may operate for the wireless pairing with the image display apparatus 100.

Meanwhile, before the wireless pairing is completed, a pointer indicating the movement of the remote control device 200 is not displayed in FIG. 7B.

For the wireless pairing, the RF module 421 of the remote control device 200 transmits the wireless channel information to the image display apparatus 100 at the first interval Tivy, and when the wiring pairing is not completed within a predetermined period, transmits the wireless channel information at the second interval Tivb less than the first interval Tivy.

Meanwhile, when the pairing is completed based on the wireless channel information of the first interval Tivy or the pairing is completed based on the wireless channel information of the second interval Tivb, the signal processing device 170 of the image display apparatus 100 may control the pointer 205 indicating the movement of the remote control device 200 to be displayed in the display 180.

Figure 7C:
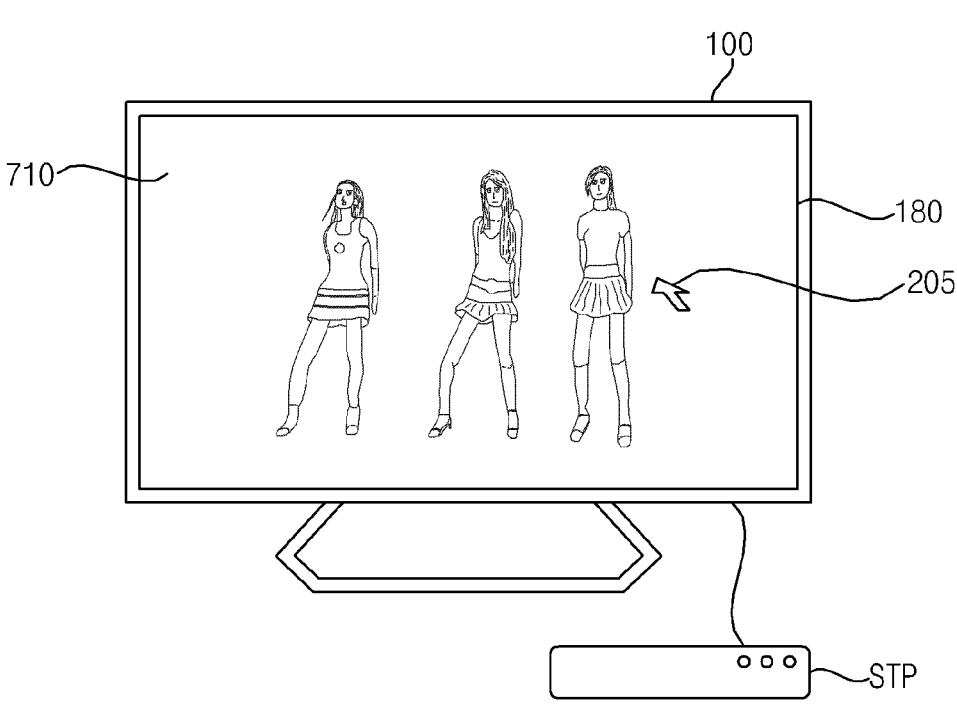
Figure 7C:
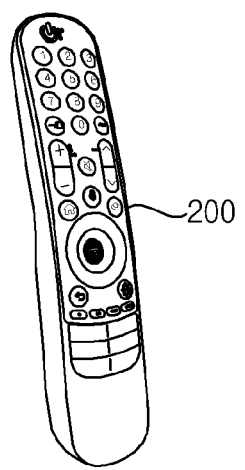

FIG. 7C is a diagram illustrating that the pointer 205 is displayed in the predetermined image 710 according to the completion of the wireless pairing between the remote control device 200 and the image display apparatus 100.

According to the display of the pointer 205, the completion of the wireless pairing between the remote control device 200 and the image display apparatus 100 may be recognized.

Meanwhile, after the power-on, the RF module 421 of the remote control device 200 may transmit the wireless channel information to the image display apparatus 100 at the first interval Tivy during a predetermined period in which pointer 205 is not displayed as in FIG. 7B.

Meanwhile, as in FIG. 7B, when the predetermined period in which the pointer 205 is not displayed elapsed, the RF module 421 of the remote control device 200 may transmit the wireless channel information at the second interval Tivb less than the first interval Tivy. As a result, the wireless pairing can be stably performed in response to the surrounding communication environment. In particular, the success rate of the wireless pairing can be increased.

Figure 8:
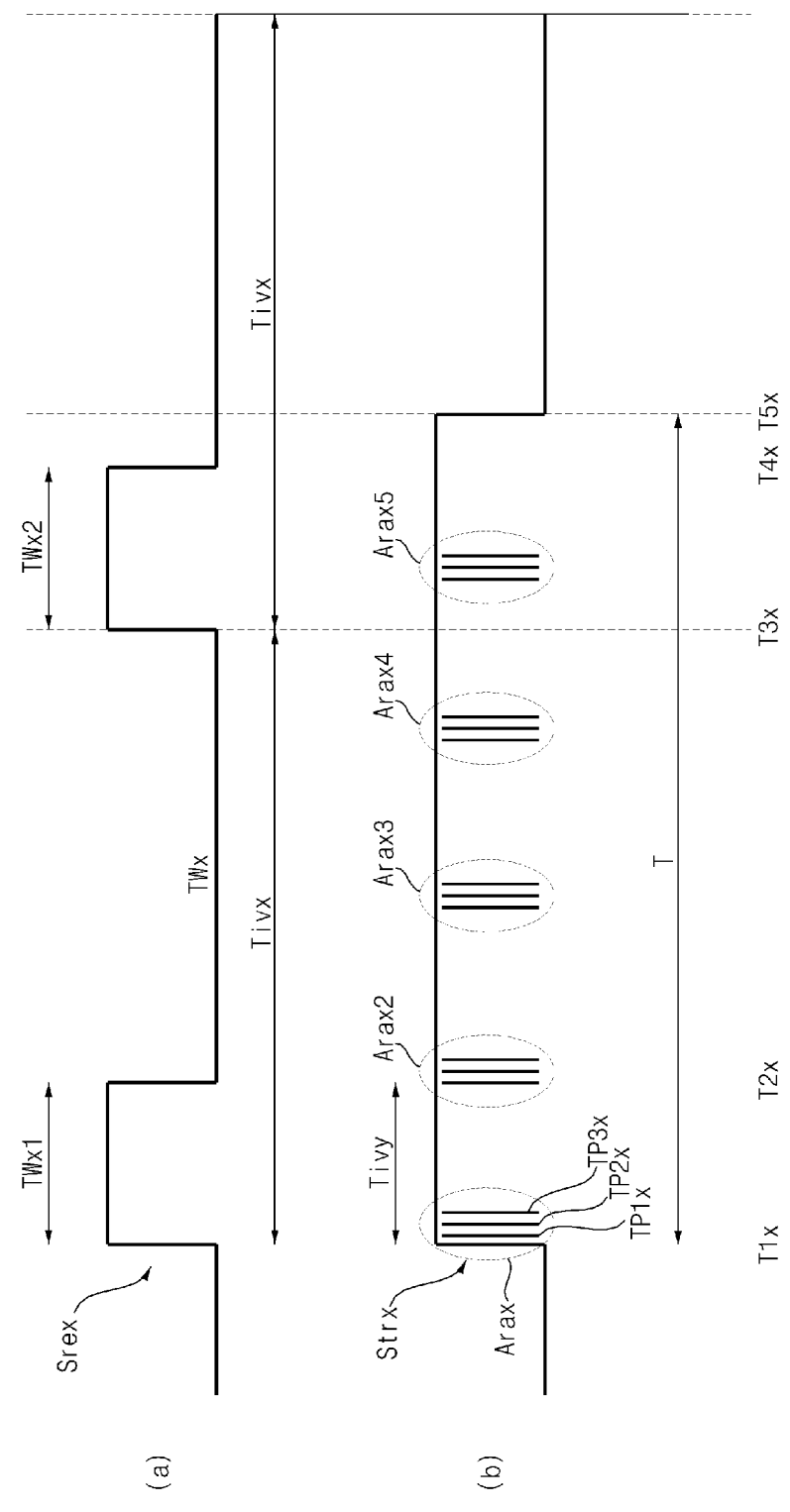

FIG. 8 is a diagram illustrating that the wireless channel information is transmitted at the first interval Tivy.

Referring to the drawing, (a) of FIG. 8 illustrates a signal waveform Srex including active periods TWx1 and TWx2 and a blank period TWx for wireless signal reception in the RF module 412 in the wireless transceiver 411 of the image display apparatus 100.

A cycle of the signal waveform Srex or an interval between the active periods TWx1 and TWx2 may be Tivx. Tivx may be approximately 100 ms.

At a time T1x, the signal waveform Srex may be converted from a low level to a high level, at a time T2x, the signal waveform Srex may be converted from the high level to the low level, at a time T3x, the signal waveform Srex may be converted from the low level to the high level, and at a time T4x, the signal waveform Srex may be converted from the high level to the low level.

(b) of FIG. 8 illustrates a signal waveform Strx including an active period T and a blank period for wireless signal transmission in the RF module 421 in the wireless transceiver 420 of the remote control device 200.

The signal waveform Strx may be converted from the low level to the high level at the time T1x, and the signal waveform Strx may be converted from the high level to the low level at a time T5x after the time T4x.

The RF module 421 of the remote control device 200 may output the plurality of wireless channel information every first interval Tivy during the active period T for the wireless signal transmission.

Meanwhile, the active period T for the wireless signal transmission may be approximately 150 ms, and the first interval Tivy may be approximately 30 ms.

Specifically, the RF module 421 of the remote control device 200 may output approximately 5 wireless channel information during the period of approximately 150 ms.

In the drawing, by 5 transmissions, Arax, Arax2, Arax3, Arax4, and Arax5 are illustrated.

Meanwhile, the plurality of wireless channel information may be transmitted to be spaced at the first channel interval. In the drawing, it is illustrated that information of three channels is transmitted to be spaced, respectively as in Tp1x, Tp2x, and Tp3x in Arax which is first wireless channel information transmission, but the present disclosure is not limited thereto, and various modifications can be made.

Referring to the drawing, 5 wireless channel information is output during the active period T for the wireless signal transmission, but only first wireless channel information Arax and fifth wireless channel information Arax5 are received during the active periods TWx1 and TWx2 for the wireless signal reception.

Accordingly, as illustrated in FIG. 1, when the RF communication is used for the wireless pairing between the mobile terminal 600 and the earphone 700, the success rate of the wireless pairing between the remote control device 200 and the image display apparatus 100 may be lowered.

Accordingly, in the present disclosure, for the wireless pairing, the RF module 421 of the remote control device 200 transmits the wireless channel information to the image display apparatus 100 at the first interval Tivy, and when the wiring pairing is not completed within a predetermined period, transmits the wireless channel information at the second interval Tivb less than the first interval Tivy. This is described with reference to FIG. 9.

Figure 9:
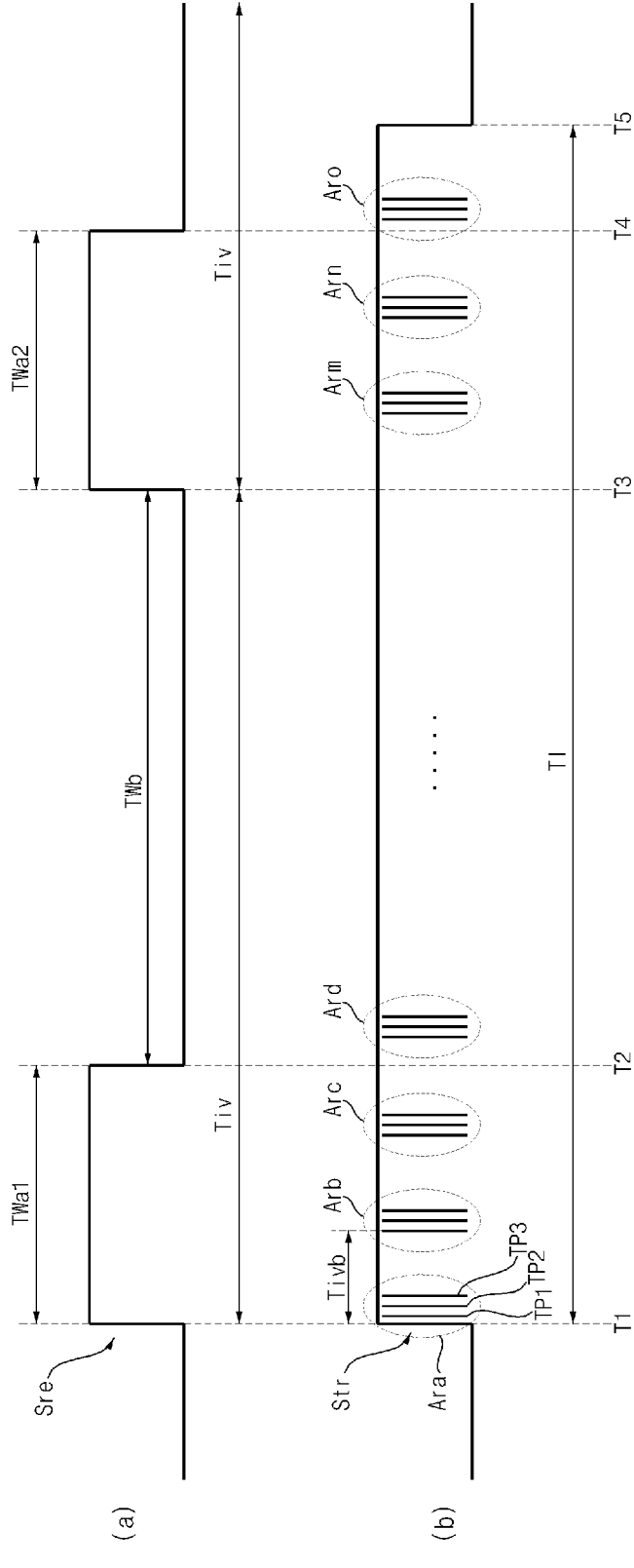

FIG. 9 is a diagram illustrating that the wireless channel information is transmitted at the second interval Tivb less than the first interval Tivy.

Referring to the drawing, (a) of FIG. 9 illustrates a signal waveform Sre including active periods TWa1 and TWa2 and a blank period TWb for wireless signal reception in the RF module 412 in the wireless transceiver 411 of the image display apparatus 100.

A cycle of the signal waveform Sre or an interval between the active periods TWa1 and TWa2 may be Tivx. Tivx may be approximately 100 ms.

At a time T1, the signal waveform Sre may be converted from the low level to the high level, at a time T2, the signal waveform Sre may be converted from the high level to the low level, at a time T3, the signal waveform Sre may be converted from the low level to the high level, and at a time T4, the signal waveform Sre may be converted from the high level to the low level.

(b) of FIG. 9 illustrates a signal waveform Str including an active period T1 and a blank period for wireless signal transmission in the RF module 421 in the wireless transceiver 420 of the remote control device 200.

The signal waveform Str may be converted from the low level to the high level at the time T1, and the signal waveform Str may be converted from the high level to the low level at a time T5 after the time T4.

The RF module 421 of the remote control device 200 may output the plurality of wireless channel information every second interval Tivb during the active period T for the wireless signal transmission.

Meanwhile, the active period T1 for the wireless signal transmission may be approximately 150 ms, and the second interval Tivb may be approximately 2.5 ms.

Specifically, the RF module 421 of the remote control device 200 may output wireless channel information at approximately 60 times during the period of approximately 150 ms.

In the drawing, by 60 transmissions, Ara, Arb, Arc, Ard, . . . , Arm, Arn, and Aro are illustrated.

Meanwhile, the plurality of wireless channel information may be transmitted to be spaced at the first channel interval. In the drawing, it is illustrated that information of three channels is transmitted to be spaced, respectively as in Tp1, Tp2, and Tp3 in Ara which is first transmission, but the present disclosure is not limited thereto, and various modifications can be made.

Referring to the drawing, the wireless channel information is output at 60 times during the active period T for the wireless signal transmission, so first to third wireless channel information Ara, Arb, and Arc is received during the first active period TWa1 for the wireless signal reception, and at least two wireless channel information Arm and Arn are received during the second active period TWa2.

According to FIG. 9, the wireless channel information may be stably received at a probability of twice or more during the active period for the wireless signal transmission as compared with FIG. 8.

Accordingly, as illustrated in FIG. 1, even though the RF communication is used for the wireless pairing between the mobile terminal 600 and the earphone 700, the success rate of the wireless pairing between the remote control device 200 and the image display apparatus 100 may be raised. As a result, the wireless pairing can be stably performed in response to the surrounding communication environment.

Meanwhile, in a case where a data packet including the wireless channel information transmitted at the second interval Tivb during the active periods TWa1 and TWa2 for the wireless signal reception is not received, the wireless pairing may not be completed.

The case where the data packet including the wireless channel information transmitted at the second interval Tivb during the active periods TWa1 and TWa2 for the wireless signal reception is not received becomes worse, for example, as the number of external devices wirelessly connected to the image display apparatus 100 increases.

Even in this case, for transmission of a remote control signal, in the embodiment of the present disclosure, in a state in which the transmission of the wireless channel information at the second interval Tivb in the RF module 421 of the remote control device 200 is performed at a predetermined number of times (e.g., 5 times) or more, when pairing with the image display apparatus 100 is not completed, the RF module 421 of the remote control device 200 does not output the RF signal, and the IR module 423 outputs the IR signal. The IR signal may be referred to as an emergency IR signal.

For example, in a state in which the pairing with the image display apparatus 100 is not completed, when the home key 209 in which both the RF communication and the IR communication are enabled operates, the RF module 421 of the remote control device 200 may not output the RF signal, and the IR module 423 may output the emergency IR signal. As a result, when the wiring pairing is not performed, the remote control signal may be emergently output through the IR communication.

FIG. 10 is a diagram illustrating that a plurality of keys of the remote control device 200 of FIG. 2 is classified.

Referring to the drawing, the power key 201 of the remote control device 200 may be an IR key in which only the IR communication is enabled.

The voice key 207 of the remote control device 200, and movement information for displaying the pointer may be an RF key in which only the RF communication is enabled.

Besides, the channel control key 204, the volume control key 203, the number key 202, the OK key 206, the color key 208, etc., may be keys in which both the IR communication and the RF communication are enabled.

Figure 11A:
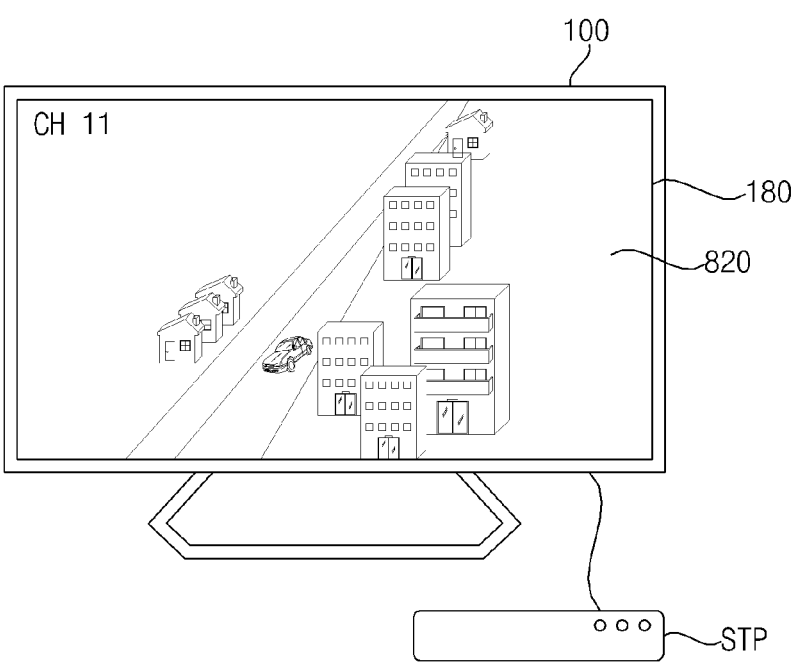
Figure 11A:

Next, FIG. 11A illustrates a recommended content display input 815 based on a user voice.

Referring to the drawing, it is illustrated that the signal processing device 170 displays a predetermined image 820, and then receives a recommended content display input 815 from the remote control device 200 based on the operation of the voice key 207 of the remote control device 200.

Specifically, in the state in which the RF communication based wireless pairing between the remote control device 200 and the image display apparatus 100 is completed, when the voice key 207 of the remote control device 200 operates, and the user voice is input, the RF module 421 of the remote control device 200 may transmit the recommended content display input 815 based on the RF communication.

As a result, the image display apparatus 100 may receive the recommended content display input 815, and the signal processing device 170 may request recommended contents to a recommendation server SVm, and receive the recommended contents, through the external device interface 130 or the network interface 135. In addition, the signal processing device 170 may control the received recommended contents to be displayed.

Figure 11B:
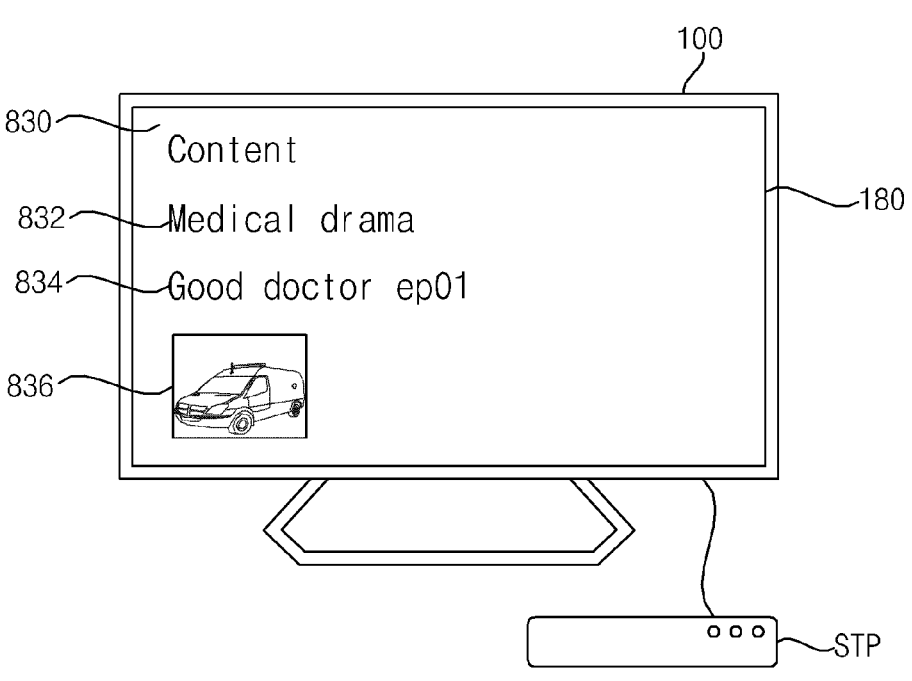

FIG. 11B illustrates that a recommended content screen 830 is displayed.

Referring to the drawing, the signal processing device 170 may control the recommended content screen 830 related to a health received from the recommendation server SVm to be displayed on the recommended content screen 830.

Meanwhile, the recommended content screen 830 may include recommended content genre information 832, a recommended content item 834, and a recommended content thumbnail item 836. As a result, contents suitable for a user URa may be recommended and displayed.

Meanwhile, the RF module 421 in the remote control device 200 according to another embodiment of the present disclosure transmits wireless channel information to the image display apparatus 100 at a first interval Tivy before setting completion for remote control of a set-top box STP or an external device (not illustrated) and transmits the wireless channel information at a second interval Tivb less than the first interval Tivy after the setting completion for the remote control of the set-top box STP or the external device (not illustrated). As a result, the set-top box STP can be stably controlled using the image display apparatus 100. In particular, the set-top box STP can be stably remotely controlled in response to the surrounding communication environment. Further, the success rate of the wireless pairing can be increased.

Figure 12:
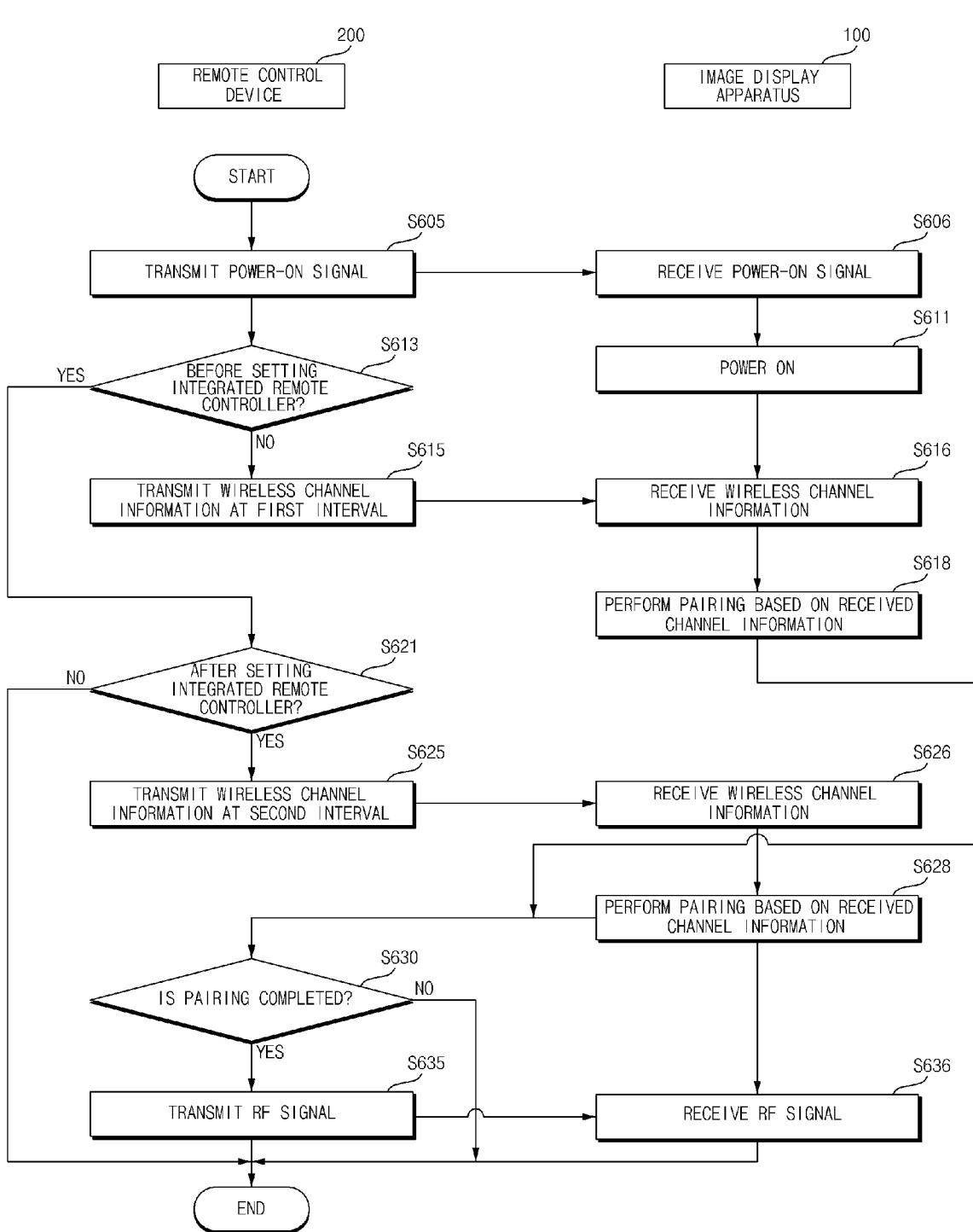
FIG. 12 is a flowchart illustrating one example of operation methods of a remote control device and an image display apparatus according to another embodiment of the present disclosure.

FIG. 12 is a flowchart illustrating one example of operation methods of a remote control device and an image display apparatus according to another embodiment of the present disclosure.

Referring to the drawing, when the power key 201 of the remote control device 200 operates, the IR module 423 of the remote control device 200 transmits a power-on signal by IR communication (S605).

In response thereto, the IR module 411 in the user input interface 150 of the image display apparatus 100 receives the power-on signal (S606).

The image display apparatus 100 may turn on a power of an internal device such as the power of the display 180 based on the received power-on signal (S611).

Next, according to the operation of the power key 201 of the remote control device 200, after the power of the image display apparatus 100 is turned on, the remote control device 200 may operate for wireless pairing with the image display apparatus 100.

Meanwhile, before integrated remote controller setting for controlling the set-top box STP (S613), the RF module 421 of the remote control device 200 transmits the wireless channel information to the image display apparatus 100 at the first interval Tivy (S615).

In this case, the wireless channel information may include a plurality of wireless channel information.

For example, the RF module 421 of the remote control device 200 may output the plurality of wireless channel information every approximately 30 ms which is the first interval Tivy during a period of 150 ms. Specifically, the wireless channel information may be output at approximately 5 times during the period of approximately 150 ms.

Next, the RF module 412 in the user input interface 150 of the image display apparatus 100 receives the wireless channel information of the first interval Tivy (S616).

The wireless transceiver 411 of the image display apparatus 100 performs pairing based on the plurality of received wireless channel information (S618).

For example, the RF module 412 in the wireless transceiver 411 of the image display apparatus 100 may select channel information having a strongest signal strength RSSI among the plurality of wireless channel information, and transmit the selected channel information to the RF module 421 of the remote control device 200.

The RF module 421 of the remote control device 200 may receive the selected channel information, and complete pairing based thereon.

As a result, the wireless pairing based on the RF communication between the remote control device 200 and the image display apparatus 100 may be completed.

Meanwhile, after integrated remote controller setting for controlling the set-top box STP (S621), the RF module 421 of the remote control device 200 transmits the wireless channel information at a second interval Tivb less than the first interval Tivy (S625).

Since remote control of the set-top box STP is impossible before the integrated remote controller setting, the wireless channel information may be transmitted at the first interval Tivy, but the remote control of the set-top box STP should be performed after the integrated remote controller setting, it is preferable to transmit the wireless channel information at the second interval Tivb less than the first interval Tivy.

For example, the RF module 421 of the remote control device 200 may output the plurality of wireless channel information every approximately 2.5 ms which is the second interval Tivb during the period of 150 ms. Specifically, the wireless channel information may be output at approximately 60 times during the period of approximately 150 ms.

Meanwhile, the plurality of wireless channel information may be transmitted to be spaced at a second channel interval less than the first channel interval. As a result, the success rate of the wireless pairing can be increased.

Next, the RF module 412 in the user input interface 150 of the image display apparatus 100 receives the wireless channel information of the second interval Tivb (S626).

The wireless transceiver 411 of the image display apparatus 100 performs pairing based on the plurality of received wireless channel information (S628).

For example, the RF module 412 in the wireless transceiver 411 of the image display apparatus 100 may select channel information having a strongest signal strength RSSI among the plurality of wireless channel information, and transmit the selected channel information to the RF module 421 of the remote control device 200.

The RF module 421 of the remote control device 200 may receive the selected channel information, and complete pairing based thereon.

As a result, the wireless pairing based on the RF communication between the remote control device 200 and the image display apparatus 100 may be completed.

The RF module 421 of the remote control device 200 may determine whether the wireless pairing is completed (S630), and wirelessly transmit an RF signal when a key in which the RF communication is enabled operates in a state in which the wireless pairing is completed (S635).

In response thereto, the RF module 412 in the user input interface 150 of the image display apparatus 100 may wirelessly receive the RF signal (S636).

In addition, the signal processing device 170 of the image display apparatus 100 may control a corresponding operation to be performed based on the received RF signal.

FIGS. 13A to 14F are diagrams referred to in description of the operation methods of FIG. 12.

Figure 13A:
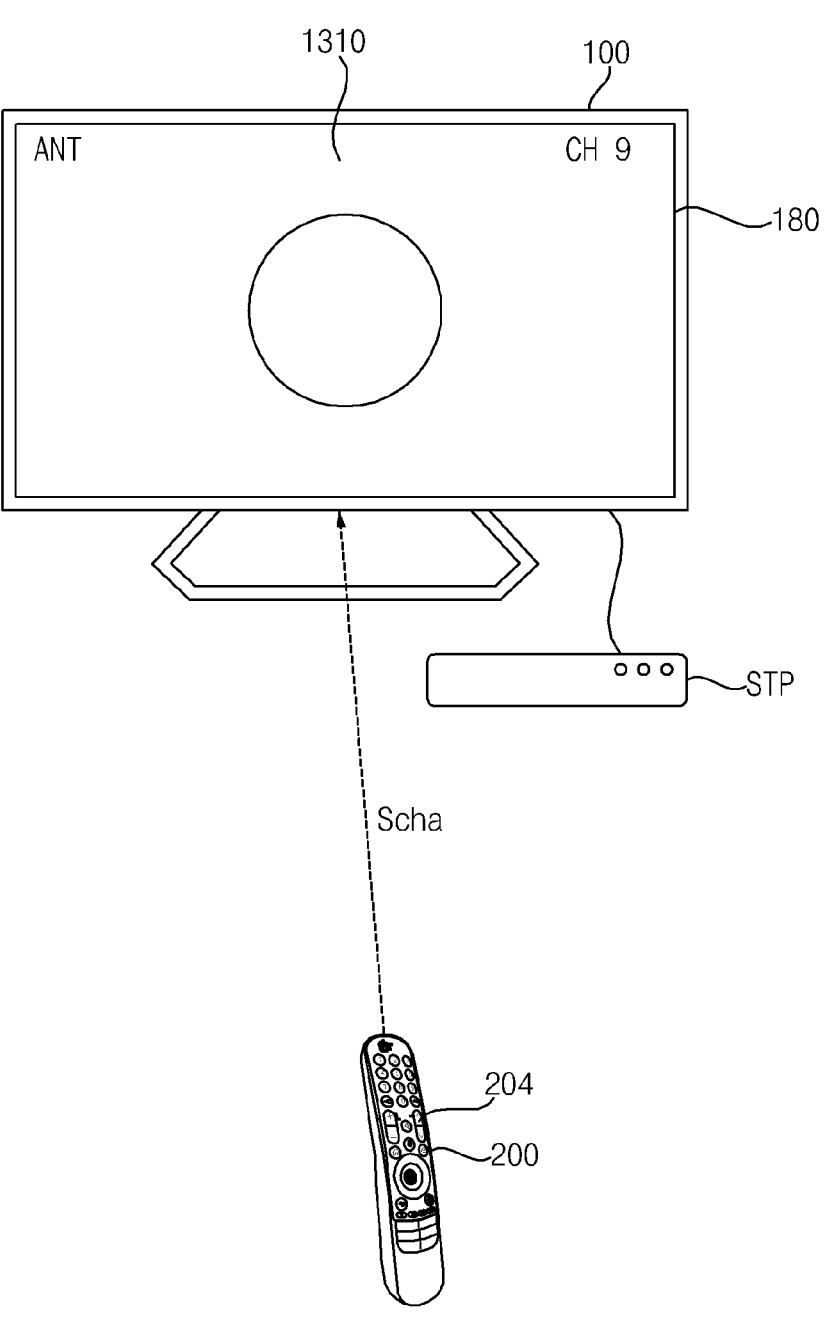
FIGS. 13A to 14F are diagrams referred to in description of the operation methods of FIG. 12.

First, FIG. 13A illustrates that the channel control key 204 of the remote control device 200 operates in a state before the setting for the remote control of the set-top box STP is completed.

As a result, a broadcasting image 1310 of channel 9 received through the broadcast reception device 105 is displayed in the display 180, and then a channel is changed.

Figure 13B:
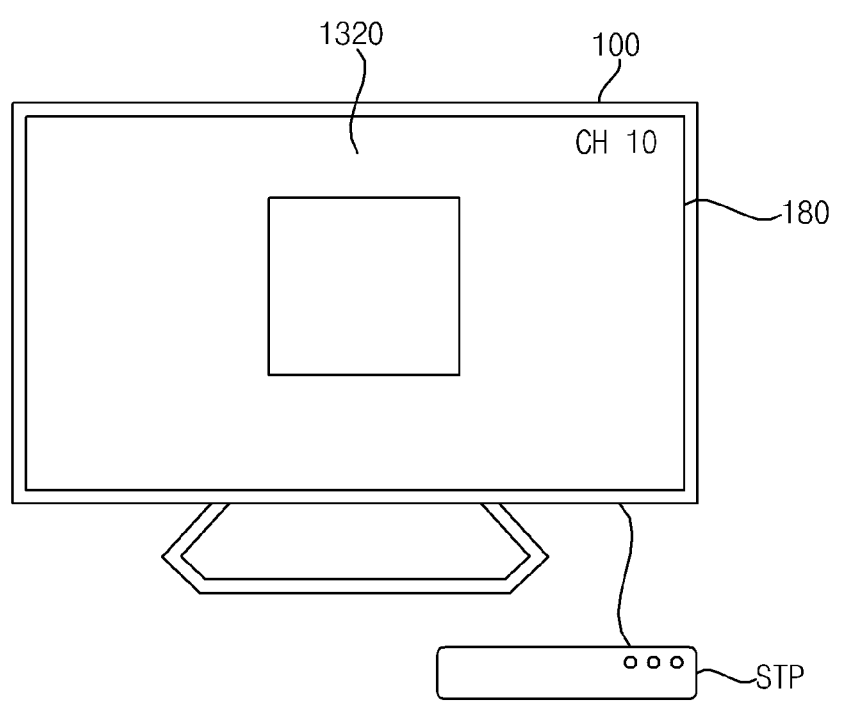
Figure 13B:
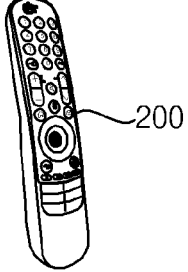

FIG. 13B illustrates that the broadcast image 1320 changed from channel 9 to channel 10 is displayed in the display 180 according to the operation of the channel control key 204 of the remote control device 200.

Meanwhile, in FIGS. 13a and 13b, when the wireless pairing between the remote control device 200 and the image display apparatus 100 is not completed, the IR signal may be input into the image display apparatus 100 according to the operation of the channel control key 204.

Meanwhile, in FIGS. 13a and 13b, in a state in which the wireless pairing between the remote control device 200 and the image display apparatus 100 is thus completed, and the wireless pairing is made, an RF signal Schb may be input into the image display apparatus 100 according to the operation of the channel control key 204.

Figure 13C:
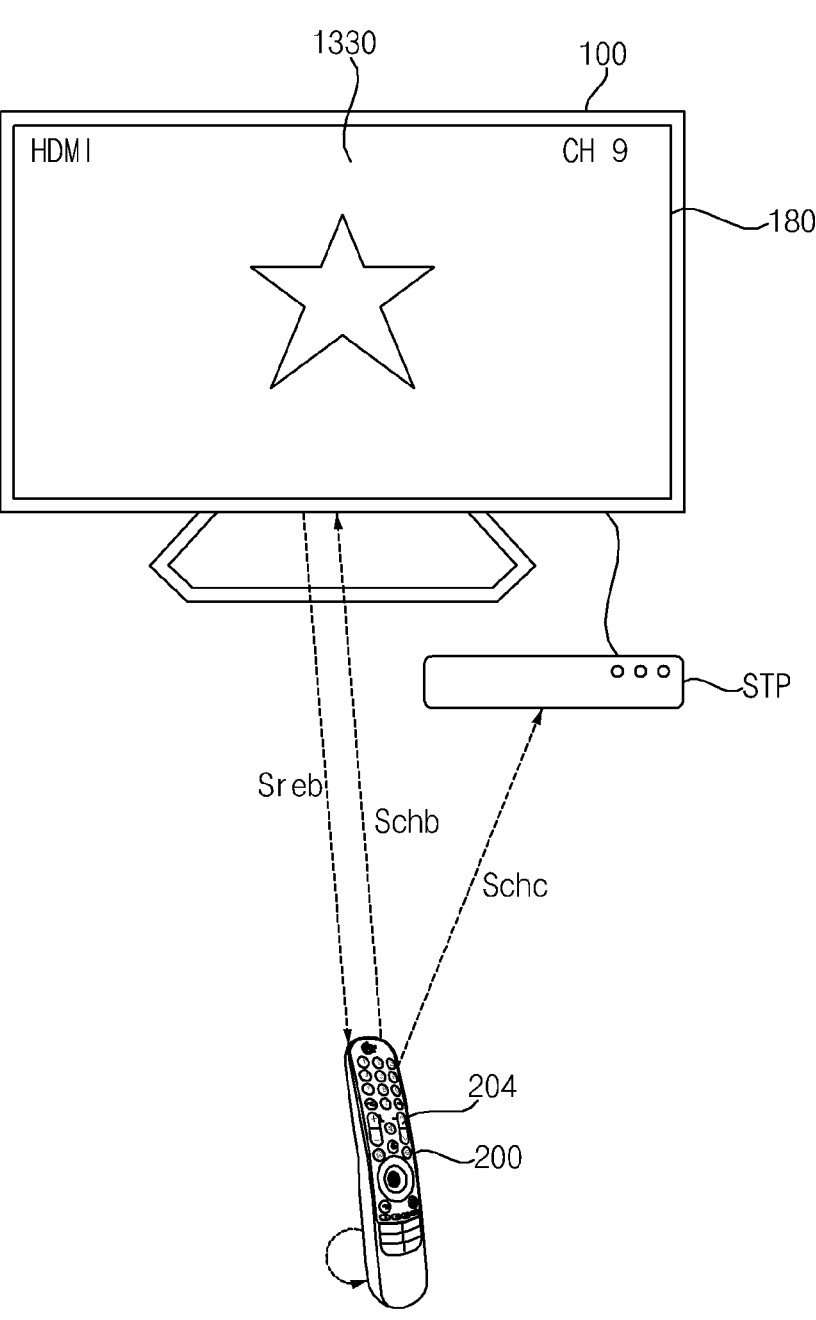

Next, FIG. 13C illustrates that the channel control key 204 of the remote control device 200 operates in a state after the setting for the remote control of the set-top box STP is completed.

In the state in which the wireless pairing between the remote control device 200 and the image display apparatus 100 is completed, and the wireless pairing is thus completed, when the channel control key 204 of the remote control device 200 operates, the RF module 421 of the remote control deice 200 transmits the RF signal Schb including a channel tuning signal, and the RF module 412 of the image display apparatus 100 receives the RF signal Schb.

Next, the RF module 412 of the image display apparatus 100 transmits an RF signal Sreb including information related to channel tuning of the set-top box STP, and the RF module 421 of the remote control device 200 receives the RF signal Sreb.

Next, the IR module 423 of the image display apparatus 100 outputs an IR signal Schc for channel tuning based on the information related to the channel tuning of the set-top box STP.

As a result, an IR module (not illustrated) of the set-top box STP receives the IR signal Schc, and outputs an external input image of which channel is changed.

As a result, an external input image 1330 of channel 9 received through the set-top box STP is displayed in the display 180, and then the channel is changed.

In this case, the external input image 133 may be received through the external device interface 130.

Figure 13D:
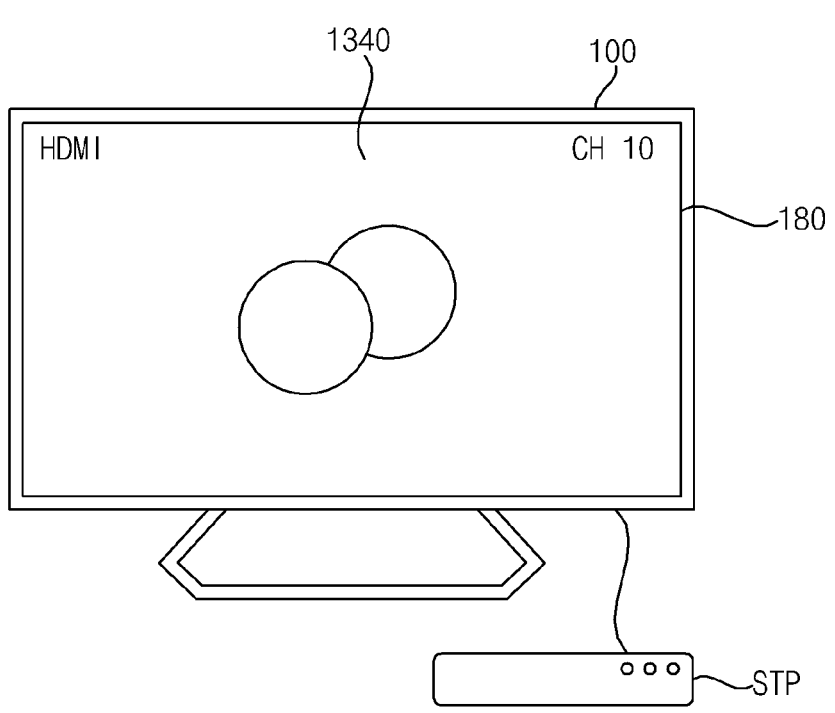
Figure 13D:
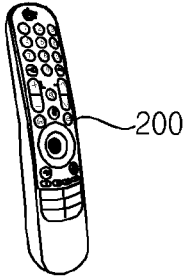

FIG. 13D illustrates that an external input image 1340 changed from channel 9 to channel 10 is displayed in the display 180 according to the operation of the channel control key 204 of the remote control device 200.

Meanwhile, FIGS. 13A to 13D illustrate contents for the remote control of the set-top box STP, but is not limited thereto, and the remote control device 200 according to the embodiment of the present disclosure is also possible to remotely control media play devices (e.g., a Blu-ray disc play device, a DVD play device, etc.,) home appliances (e.g., a refrigerator, a washing machine, a dryer, a cooling device, etc.), etc.

Meanwhile, in a state in which an operation mode of the remote control device 200 is set to an integrated remote mode in which the set-top box STP or the external device is also enabled to be remotely controlled, when a key corresponding to play, pause, etc., for the remote control of the external device operates, the RF module 421 of the remote control device 200 may omit the wireless channel information transmission of the first interval Tivy, and immediately transmit the wireless channel information at the second interval Tivb less than the first interval Tivy for rapid wireless pairing.

Alternatively, in a state in which an input mode of the image display apparatus 100 is set to an external input mode of receiving an image from the set-top box STP or the external device, when the key corresponding to play, pause, etc., for the remote control of the external device operates, the RF module 421 of the remote control device 200 may omit the wireless channel information transmission of the first interval Tivy, and immediately transmit the wireless channel information at the second interval Tivb less than the first interval Tivy for rapid wireless pairing. As a result, the rapid wireless pairing is performed, and consequently, rapid remote control for the set-top box STP or the external device becomes possible.

FIGS. 14A to 14F are diagrams related to setting for remote control of the set-top box STP or an external device (not illustrated).

Figure 14A:
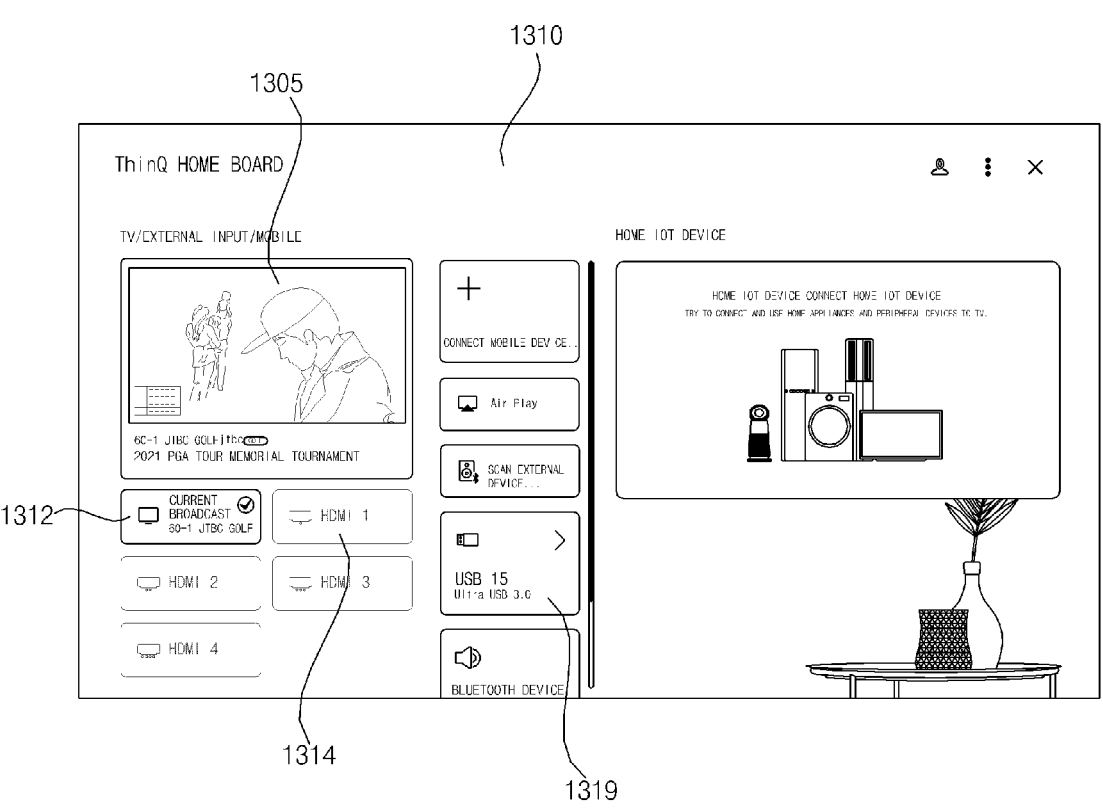

First, FIG. 14A illustrates a setting screen displayed in the image display apparatus 100.

Referring to the drawing, the signal processing device 170 of the image display apparatus 100 may control the setting screen 1310 to be displayed according to an input signal.

The setting screen 1310 may include a currently displayed image 1305, current displayed image information 1312, external input terminal information 1314 such as HDMI, external input terminal information 1319 such as USB, etc.

Before setting for the remote control of the set-top box STP or the external device (not illustrated), the signal processing device 170 of the image display apparatus 100 may control terminal information such as 'HDMI 1' to be displayed because there is no external device connected to the external input terminal information 1314 such as the HDMI.

Figure 14B:
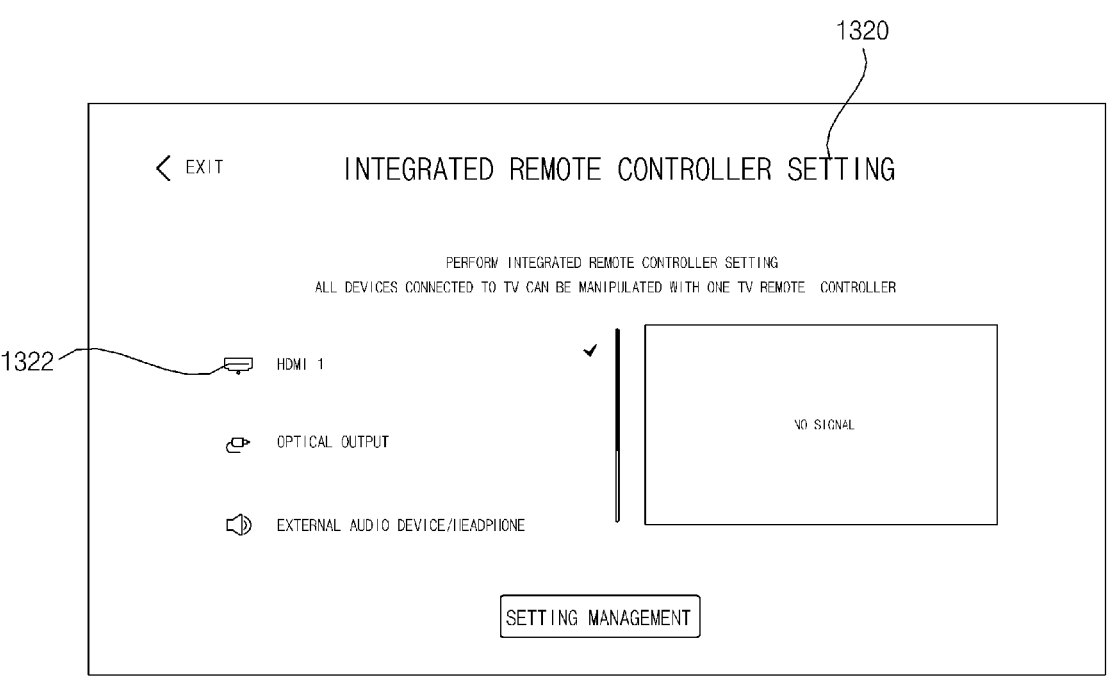

Meanwhile, when the external input terminal information 1314 such as the HDMI is selected, the signal processing device 170 of the image display apparatus 100 may control an integrated remote controller setting screen 1320 illustrated in FIG. 14B to be displayed.

The integrated remote controller setting screen 1320 may include an 'HDMI 1' item 1322 which is an external input terminal item.

Figure 14C:
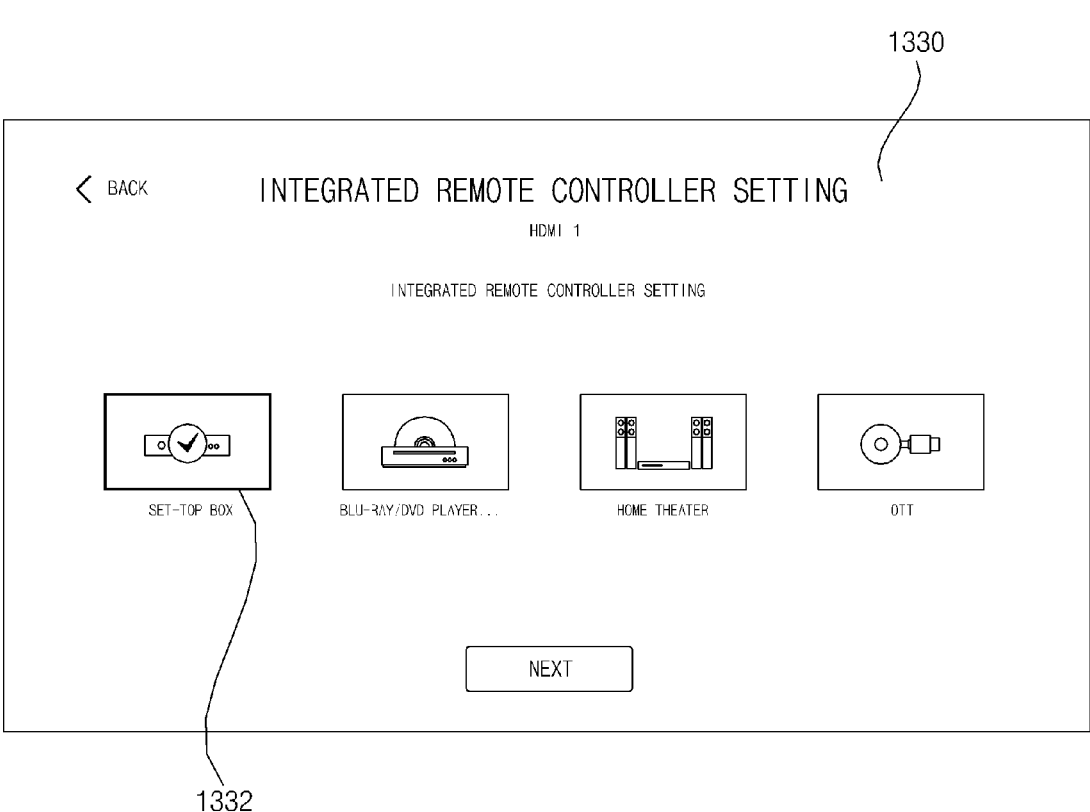

Meanwhile, when the 'HDMI 1' item 1322 is selected, the signal processing device 170 of the image display apparatus 100 may control a screen 1330 including a plurality of external device items illustrated in FIG. 14C to be displayed.

Figure 14D:
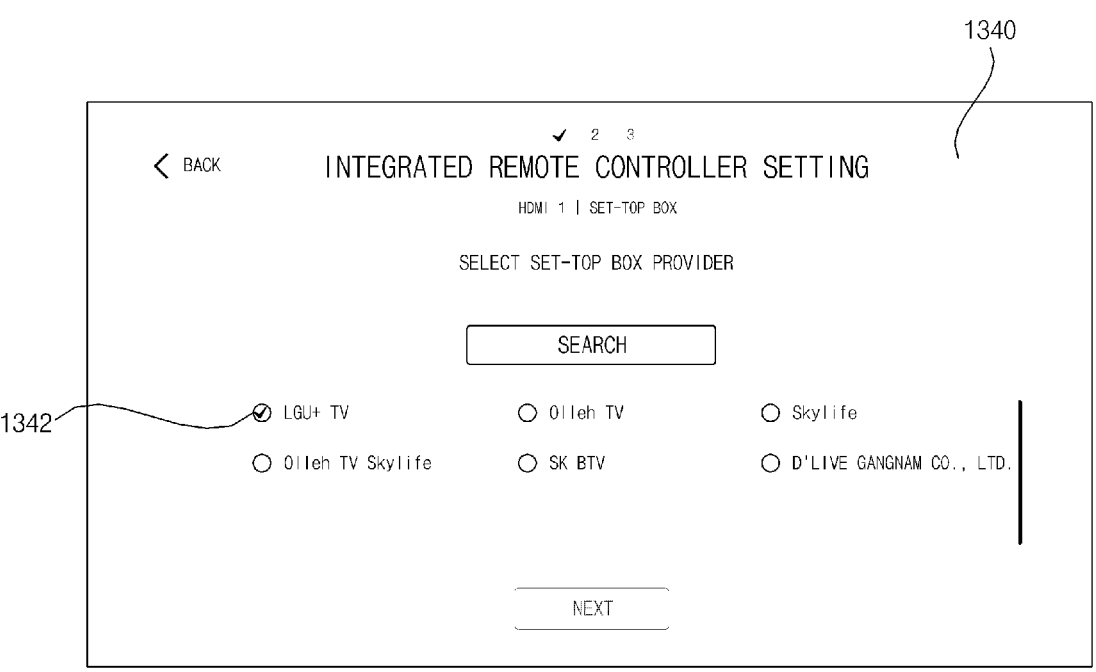

When a set-top box item 1332 among the plurality of external device items is selected, the signal processing device 170 of the image display apparatus 100 may control a screen 1340 including a plurality of broadcasting service provider items illustrated in FIG. 14D to be displayed.

Figure 14E:
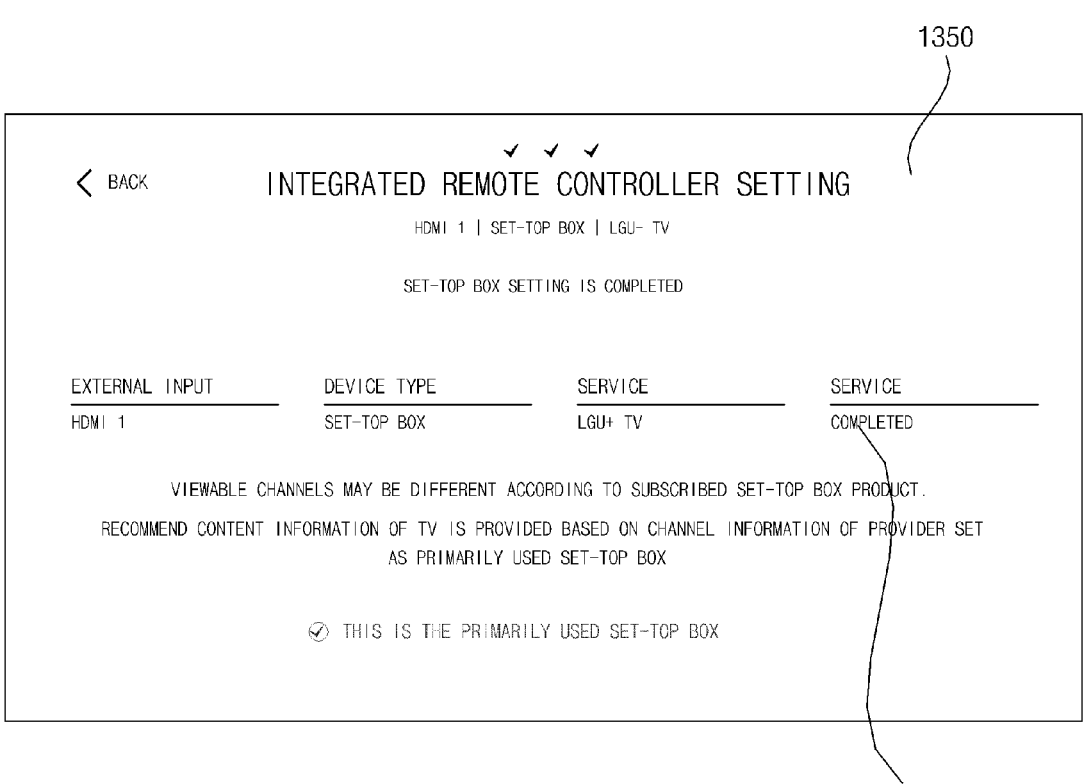

When a first broadcasting service provider item 1342 among the plurality of broadcasting service provider items is selected, the signal processing device 170 of the image display apparatus 100 may control a set-top box setting screen 1350 illustrated in FIG. 14E to be displayed.

Figure 14F:
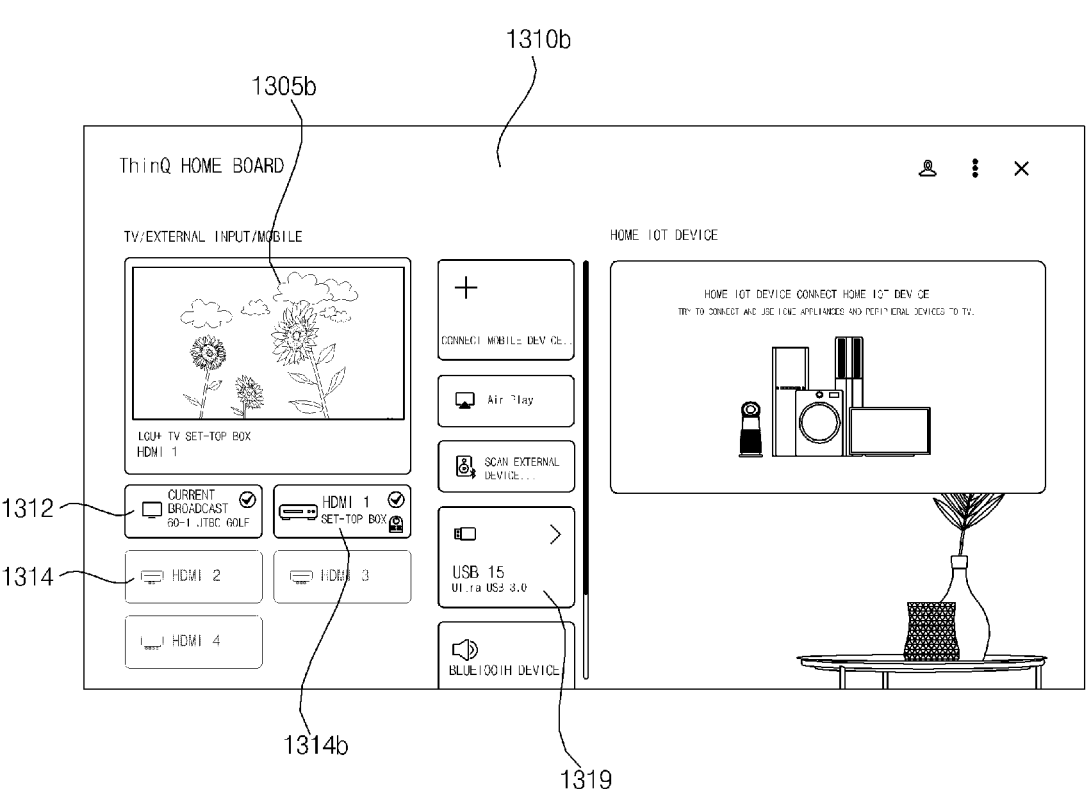

When a setting completion item 1352 in the set-top box setting screen 1350 is selected, the signal processing device 170 of the image display apparatus 100 may control a setting screen 1310b illustrated in FIG. 14F to be displayed.

The setting screen 1310b of FIG. 14F is similar to the setting screen 1310 of FIG. 14A, but a currently displayed image is not the broadcasting image 1305 but the external input image 1305b, and FIG. 14F is different from FIG. 14A in terms of external input terminal information 1314b connected to the set-top box.

According to FIGS. 14A to 14F, when setting for the remote control of the set-top box STP or the external device (not illustrated) is completed, the set-top box STP may also be remotely controlled in addition to the image display apparatus 100 using the remote control device 200 as in FIG. 13C.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. A remote control device comprising:
a plurality of keys;
an IR module configured to perform IR communication in response to a part of the plurality of keys; and
an RF module configured to perform RF communication in response to another part of the plurality of keys,
wherein the RF module transmits wireless channel information to an image display apparatus at a first interval, and when pairing with the image display apparatus is not completed, transmits the wireless channel information at a second interval less than the first interval,
wherein after the pairing with the image display apparatus is completed,
when a key corresponding to the RF communication among the plurality of keys operates, the RF module outputs a RF signal corresponding to the key based on the RF communication, and
when a key corresponding to the IR communication among the plurality of keys operates, the IR module outputs an IR signal corresponding to the key based on the IR communication.

2. The remote control device of claim 1, wherein the RF module transmits a plurality of wireless channel information to the image display apparatus at the first interval, and
wherein when the pairing with the image display apparatus is not completed after transmitting the wireless channel information at the first interval, the RF module transmits the plurality of wireless channel information at the second interval.

3. The remote control device of claim 2, wherein an interval for transmitting the plurality of wireless channel information upon transmitting the plurality of wireless channel information at the second interval is less than an interval for transmitting the plurality of wireless channel information upon transmitting the plurality of wireless channel information at the first interval.

4. The remote control device of claim 1, wherein when the pairing with the image display apparatus is terminated after transmitting the wireless channel information at the second interval, the RF module transmits the wireless channel information at the second interval other than the first interval.

5. The remote control device of claim 1, wherein the RF module transmits the wireless channel information to the image display apparatus at the first interval again when the pairing with the image display apparatus is terminated after transmitting the wireless channel information at the second interval, and
wherein the RF module transmits the plurality of wireless channel information at the second interval when the pairing with the image display apparatus is not completed after transmitting the wireless channel information at the first interval.

6. The remote control device of claim 1, wherein the IR module transmits a power-on signal corresponding to a power key operation among the plurality of keys, and
wherein the RF module transmits the wireless channel information to the image display apparatus at the first interval after transmitting the power-on signal, and
wherein the RF module transmits the wireless channel information at the second interval less than the first interval when the pairing with the image display apparatus is not completed within a predetermined period.

7. The remote control device of claim 1, wherein the RF module does not output the RF signal when a key corresponding to only the RF communication among the plurality of keys operates before the pairing with the image display apparatus is completed.

8. The remote control device of claim 1, wherein when a key corresponding to both the RF communication and the IR communication among the plurality of keys operates before the pairing with the image display apparatus is completed, the RF module does not output the RF signal, and the IR module outputs an IR signal corresponding to the key based on the IR communication.

9. The remote control device of claim 8, wherein when a key corresponding to both the RF communication and the IR communication among the plurality of keys operates after the pairing with the image display apparatus is completed, the RF module outputs the RF signal, and the IR module does not output the IR signal.

10. The remote control device of claim 1, wherein the IR module outputs the IR signal when a key corresponding to only the IR communication among the plurality of keys operates before the pairing with the image display apparatus is completed.

11. The remote control device of claim 1, wherein the key corresponding to the RF communication among the plurality of keys includes a voice key,
wherein the key corresponding to the IR communication among the plurality of keys includes a power key, and
wherein the key corresponding to both the RF communication and the IR communication among the plurality of keys includes a channel control key, a volume control key, a number key, an OK key, and a color key.

12. The remote control device of claim 1, wherein the RF module transmits the wireless channel information to the image display apparatus at the first interval before setting for remote control of a set-top box or an external device is completed, and
wherein the RF module transmits the wireless channel information at a second interval less than the first interval after the setting for remote control of the set-top box or the external device is completed.

13. The remote control device of claim 1, wherein the RF module transmits the wireless channel information to the image display apparatus at the first interval when a power saving mode is switched to a power saving mode release, and wherein the RF module transmits the wireless channel information at the second interval less than the first interval when the pairing with the image display apparatus is not completed within a predetermined period.

14. The remote control device of claim 1, wherein when the pairing with the image display apparatus is not completed in a state in which the transmission of the wireless channel information at the second interval in the RF module is performed at a predetermined number of times or more, the RF module does not output the RF signal, and the IR module outputs the IR signal.

15. A remote control device comprising:

a plurality of keys;

an IR module configured to perform IR communication in response to a part of the plurality of keys; and an RF module configured to perform RF communication in response to another part of the plurality of keys, wherein the RF module transmits wireless channel information to an image display apparatus at a first interval before setting for remote control of a set-top box or an external device is completed, and transmits the wireless channel information at a second interval less than the first interval after the setting for remote control of the set-top box or the external device is completed, when a key corresponding to the RF communication among the plurality of keys operates, the RF module outputs a RF signal corresponding to the key based on the RF communication, and when a key corresponding to the IR communication among the plurality of keys operates, the IR module outputs an IR signal corresponding to the key based on the IR communication.

16. An image display apparatus comprising:

a display;

a signal processing device configured to output an image signal to the display;

a remote control device; and an interface configured to perform communication with the remote control device, wherein the remote control device comprising:

a plurality of keys;

an IR module configured to perform IR communication in response to a part of the plurality of keys; and an RF module configured to perform RF communication in response to another part of the plurality of keys, wherein the RF module transmits wireless channel information to an image display apparatus at a first interval, and when pairing with the image display apparatus is not completed, transmits the wireless channel information at a second interval less than the first interval, wherein the interface performs wireless pairing with the remote control device based on the wireless channel information received during a first period between the first period and a second period following the first period.

17. The image display apparatus of claim 16, wherein the interface receives the wireless channel information at the first interval after receiving a power-on signal, and receives the wireless channel information at a second interval less than the first interval when pairing with the remote control device is not completed within a predetermined period.

18. The image display apparatus of claim 16, wherein the signal processing device controls a setting screen for remote control of a set-top box or an external device to be displayed.

* * * * *